United States Patent [19]

Meinecke et al.

[11] Patent Number: 5,319,754
[45] Date of Patent: Jun. 7, 1994

[54] DATA TRANSFER SYSTEM BETWEEN A COMPUTER AND A HOST ADAPTER USING MULTIPLE ARRAYS

[75] Inventors: Jon M. Meinecke, Denton; Michael R. VanBuskirk, Plano, both of Tex.

[73] Assignee: Compaq Computer Corporation, Houston, Tex.

[21] Appl. No.: 770,617

[22] Filed: Oct. 3, 1991

[51] Int. Cl.⁵ ............................................. G06F 13/00
[52] U.S. Cl. .................... 395/325; 364/237.9; 364/238.5; 364/238.9; 364/239; 364/238.3; 364/260.1
[58] Field of Search ................ 395/200, 325, 500, 800

[56] References Cited

U.S. PATENT DOCUMENTS

| | | | |
|---|---|---|---|
| 4,156,907 | 5/1979 | Rawlings et al. | 395/200 |
| 4,831,523 | 5/1989 | Lewis et al. | 395/275 |
| 5,063,494 | 11/1991 | Davidowski et al. | 395/800 |

OTHER PUBLICATIONS

Donnan, R. A. and Kersey, J. R., Synchronous Data Link Control: A Perspective, IBM Systems Journal No. 2, pp. 140–162, 1974.

*Primary Examiner*—Robert B. Harrell
*Assistant Examiner*—Ayni Mohamed
*Attorney, Agent, or Firm*—Pravel, Hewitt, Kimball & Krieger

[57] ABSTRACT

A communication system including one or more host adapters connected to a host computer, each adapter having multiple serial communication ports for transferring data between the computer and several TTY devices. Several of the adapter's serial ports include a high speed serial link for communicating with a data concentrator. The adapter automatically detects the presence of a concentrator connected to a switchable port and switches to the high speed link. Each concentrator includes multiple serial ports for communicating with TTY devices, and a high speed serial link for communicating with the adapter's high speed link. The concentrators allow more than one TTY device to share a single adapter serial port. Data from all of the TTY devices is accumulated into an adapter data buffer during a configurable time period or until a certain amount of data is accumulated, at which time the adapter interrupts the computer and transfers the accumulated data to the computer in one transfer operation. Likewise, the computer accumulates data for the TTY devices and transfers this data to the adapter in one transfer operation. Communication between the adapters and concentrators through the high speed serial communication link is implemented using a small fixed-size addressed packet to achieve a low overhead, high performance communications protocol. Each high speed link between an adapter and a concentrator is implemented to provide inherent flow control of data. The concentrators include a fail safe global flow control mechanism to prevent overflow of data from the TTY devices.

2 Claims, 7 Drawing Sheets

DATA TRANSFER SYSTEM BETWEEN A COMPUTER AND A HOST ADAPTER USING MULTIPLE ARRAYS

CROSS-REFERENCE TO RELATED APPLICATIONS

This patent application relates to U.S. patent application Ser. No. 771,143, now U.S. Pat. No. 5,280,586, filed Oct. 3, 1991, entitled "Expandable Communication System Using Data Concentration"; U.S. patent application Ser. No. 771,159, now U.S. Pat. No. 5,226,040 filed on Oct. 3, 1991, entitled "Data Concentration Interface for Configuration of Multiple TTY Devices"; U.S. patent application Ser. No. 771,169, filed Oct. 3, 1991, entitled "Expandable Communication System with Data Flow Control"; U.S. patent application Ser. No. 771,121, now U.S. Pat. No. 5,222,062, filed Oct. 3, 1991, entitled "Expandable Communication System with Automatic Data Concentrator Detection"; and U.S. patent application Ser. No. 770,600, now abandoned, filed Oct. 3, 1991, entitled "Data Transfer System with Variable Data Buffer Size and Programmable Interrupt Frequency."

FIELD OF THE INVENTION

This invention relates to the field of digital data processing systems, and more particularly relates to communication of information between components in such systems.

BACKGROUND OF THE INVENTION

In the field of digital data processing systems, as the computer capabilities of data processing devices have increased, both in terms of speed, efficiency, and complexity, the number of users or applications which may be concurrently supported by a single central processing device has also increased.

Often, the number of remote devices in a system exceeds the number of separate input/output (I/O) ports of the central processing device. In this case, a multiplexing communications system may be implemented which allows multiple remote devices to share a common one of the central device's I/O ports.

Remote or "peripheral" devices, such as user terminals, printers, modems, data storage devices, data acquisition devices, and the like, must frequently exchange information with a central processing unit, and as the number of remote devices increases, such communication of data between peripheral devices and a central unit must be highly efficient. The communications system must also allow the central device to selectively exchange data with any one of the remote devices, and each remote device must have a unique identity as seen by the central device. Accordingly, any communications scheme for multiplexed systems must include not only the hardware components for implementing the actual data link, but also a communications protocol for use with the hardware, for allowing data transferred on the link to be associated with a particular sender or receiver.

Maintaining the identity of devices and data in a multiplexed system can be accomplished in a number of ways. One method involves the assignment of a unique identification code to each device in the system, including identification of the sender and/or receiver of data within the data itself as it is transmitted along the shared data link. An example of this is the so-called address/packet protocol, wherein all information transmitted on the shared data link is of a standard format which includes device identification fields. Packets of data transmitted on a data link that is shared by multiple devices could be received by all devices at once; each device could then decode the identification field of the incoming packets to determine whether the data is intended for it.

In another type of multiplexing, called Time Division Multiplexing (TDM), the identity of data is determined by the time of its transmission on the shared medium. Each device sharing a common data link is allocated, in a regular and cyclical fashion, a fixed period of time during which it has access to the data link. If a first device needs to send data, it must wait until its allocated time slot before sending it. The identity of the sending device is thus implicitly known to the receiving device according to the time of transmission.

Alternately, access to a shared data link can be multiplexed on a demand, or First-Come-First-Served (FCFS) basis, in which a device is granted access to the data link not in a cyclical fashion, but according to its needs. Often, demand multiplexing is implemented through the use of a separate multiplexor unit, which receives requests for access to the shared data link from multiple devices, and allocates access according to a FCFS algorithm. With demand multiplexing, the multiplexor logic must be capable of informing each device of the source of data transmitted on the shared link, since time slices are not allocated in a repeating, cyclical manner.

Additionally, variations of demand multiplexing can be implemented wherein the FCFS algorithm is replaced by a weighted algorithm which considers other factors, such as varying levels of device priority, in allocating access to the multiplexed data link. In any non-symmetrical implementation in which one device may have temporary or permanent priority over another, care must be taken that low priority devices are not prevented entirely from gaining access to the shared data link by higher priority devices. Typically it is the duty of the multiplexing logic (either software or hardware) to ensure equity or near-equity of access to a shared communication medium.

The aforementioned methods of multiplexing each have their disadvantages. Multiplexing schemes typically require substantial hardware support for allocating access to the shared link in an efficient and equitable manner. In pure TDM schemes, inefficiency is unavoidably introduced if any devices are idle, because the shared link would go unused during an idle device's time slot. Though no bandwidth may be lost in demand and other priority-based access schemes, these methods may also suffer from inefficiency if the multiplexing algorithm allowed one very active device to dominate over all others. In address/packet protocol multiplexing, on the other hand, each participating device must provide hardware or software for "de-packetizing" all incoming data packets to determine the intended recipient. Hardware or software must also be provided in each device for "packetizing" all outgoing data. The processing overhead for packetization and depacketization is further increased if the packet size is allowed to be variable under a given protocol.

The addition of devices or user terminals to multi-user systems often requires a great deal of system reconfiguration. As the limits of the system's communications hardware are reached, new hardware must be added, or the existing hardware must be replaced by new, more densely packed hardware. Such hardware changes typically involve reconfiguration of the system software or firmware to accommodate the new hardware.

SUMMARY OF THE INVENTION

The present invention provides a communications system that can be reconfigured with respect to the number of remote devices without requiring alteration of communication software in the central device. The communications system includes hardware and an associated communications protocol that affords efficient and equitable communication between remote devices and a central device, and that is economical to implement even when remote devices are located relatively far from the host. The communications system provides the capability to modify the communications configuration depending upon the needs of the system having various numbers of devices with various speeds and communication protocols. The system allows remote devices to be located very far from a central device, without introducing significant degradation of overall system performance.

The foregoing and other features of the present invention are realized in a communications system comprising one or more host adapters, each equipped with multiple serial communication ports capable of exchanging data in serial form with one or more remote devices. Each host adapter is provided with an additional communications interface, which is appropriate for exchanging data with a host processing unit or communications processor. Several of the serial communication ports on the host adapter include switching means to enable a high speed serial communication link on these ports. When expansion is desired, a data concentrator may be connected to any of the switchable ports of the host adapter instead of a device. The host adapter is capable of detecting the data concentrator through a software command or an auto-detection mechanism, and enabling the high speed communications link to interface with the data concentrator.

The data concentrators are also provided with multiple serial communications ports, and are capable of exchanging data in serial form with one or more devices. A high speed serial communications port allows a concentrator to be coupled to any one of the switchable ports of the host adapter in place of a single device. In this manner, concentrators perform a multiplexing function, and permit more than one device to share a single serial port of the host adapter.

Communication between the host processing unit (host) and the host adapters is enhanced by two software packages compatible with the host's operating system. The preferred embodiment runs in the UNIX environment, but the present invention can be implemented on other operating systems as well. A device driver is provided to execute on the host and interfaces directly with the host adapter. A command protocol between the device driver and the adapter gives the device driver control over the operations of the adapter. The device driver can command the adapter to initialize data structures, to provide status information, to set up direct memory access (DMA) and interrupt channels, to configure all of the remote devices coupled through the host adapter and to do many other functions necessary to establish communications between the host and the remote devices through the adapter.

The device driver can also retrieve from the adapter the number of remote devices as well as a unique identifier for each device. These commands are passed through a set of mailbox registers provided on the adapter and mapped into the input/output (I/O) space of the host.

The device drivers work in conjunction with a software configuration and database management utility, as well as with the host adapters, to configure each of the remote devices coupled through any of the host adapters. The management utility configures the operating system of the host which builds and manages a cross-reference data file comprising the unique identity and configuration of each remote device. The data file is maintained on the host system, such as on a hard disk of the host computer. The device drivers use the cross-reference data file to identify and to establish the configurations of the remote devices. The device drivers, however, may not directly access the devices, but instead send the configuration commands to the host adapter pursuant to a command protocol established between the host and the host adapter. The host adapter follows the commands and configures each device either directly, or indirectly through the data concentrators. The host adapter assigns unique identifiers to each remote device, and these identifiers are passed back to the host and are maintained in the cross-reference data file.

Data transfer between the host and host adapters is implemented in a manner which reduces overhead, simplifies database structures, increases efficiency, and reduces the processing requirements of the host. A set of database I/O buffers in the memory of the host facilitate data transfer. A contents buffer, maintained in the host's I/O space and copied in the host adapter's RAM, is used to identify each byte of data in the database buffer. Also, each host adapter contains enough local RAM to interface with these database buffers. Data from all of the remote devices, whether connected directly to the host adapter or coupled through a data concentrator, is combined and stored on the host adapter's local RAM. When a certain amount of data is compiled, or, after a certain configurable amount of time has passed, the data in the RAM is transferred to the host's database buffers in one transfer operation. In this manner, multiple bytes of data are sent in one transfer operation from multiple devices, rather than one operation for each byte or for each device. The contents buffer is used to identify each byte in the database buffer, so that no particular order need be maintained. In a similar manner, the host builds up the database and the data is transferred to the local RAM of the adapter in one transfer operation. Furthermore, the adapters support direct memory access (DMA) such that the adapter can control the data transfer to the host to free up the host for other tasks. These methods allow reduced overhead and reduced processing requirements for the host which frees much of the host processor's time for other tasks.

The present embodiment supports up to four adapters to be installed on the host. If more than one adapter is installed in the host system, pairs of adapters may communicate small amounts of data and control information through an interboard communication connector located on each adapter. The adapters may be configured to operate independently or in pairs. Each adapter or pair of adapters requires a system (host) interrupt request (IRQ) level and a DMA channel. Pairing of adapters allows sharing of system resources of an IRQ level and a DMA channel. Sharing of the system interrupt between pairs of adapters is arbitrated in software via the communications channel provided by the interboard cable.

The high speed serial communication link between a host adapter and a data concentrator is presently implemented with high speed receiver/transmitters (HSRT's) capable of speeds of up to 600 kbits per second. A command protocol is also established between the host adapter and the data concentrators. In this manner, the host adapter can control the operations of the data concentrators and the communication configuration of each remote device attached to the data concentrators. The data concentrators can also initiate a fail-safe global flow control state to prevent overflow of data coming in from all the remote devices connected to that particular data concentrator. All commands, including flow control commands, and data transfer share the same high speed link. For this purpose, the present invention uses a fixed-size, relatively small addressed packet to achieve a low-overhead, high performance protocol for demand multiplexing. The packet comprises a frame-type field, an address field and a data field. The frame-type field indicates whether the packet contains a command or data. The address field identifies the specific remote device if the information is sent from, or to be sent to, that remote device. The contents of the data field depends upon the frame-type field and either contains data or command specific parameters. If digital information is traveling from the host adapter to the data concentrator, the adapter assembles the packet and the data concentrator disassembles the packet and transfers data to the remote devices, if necessary. In a similar manner, the data concentrator assembles the packet containing digital information traveling from the concentrator to the adapter, and the adapter disassembles the packet and stores the information in its local RAM, if necessary. It will be appreciated that the data concentrators require little RAM due to the very small fixed-size communication protocol packet.

The high speed interface also comprises unique inherent flow control of digital information. In the present embodiment, each switchable channel on the host adapter, as well as each data concentrator, includes an HSRT to implement a full duplex synchronous high speed communications link for transferring digital information. The link includes two clock signal lines, a transmit and a receive signal line. The receiving HSRT provides the clock to the transmitting HSRT, to latch the data into the receiving HSRT across the data link. In this manner, the receiver, whether it is a data concentrator or a host adapter, controls when data is accepted.

BRIEF DESCRIPTION OF THE DRAWINGS

These and other novel features believed characteristic of the communications system of the present invention are set forth in the appended claims. The invention itself, however, as well as additional features and advantages thereof, will be best understood by reference to a detailed description of a specific embodiment which follows, when read in conjunction with the accompanying drawings, wherein:

DETAILED DESCRIPTION OF A SPECIFIC EMBODIMENT

Table of Contents

Figure 1:
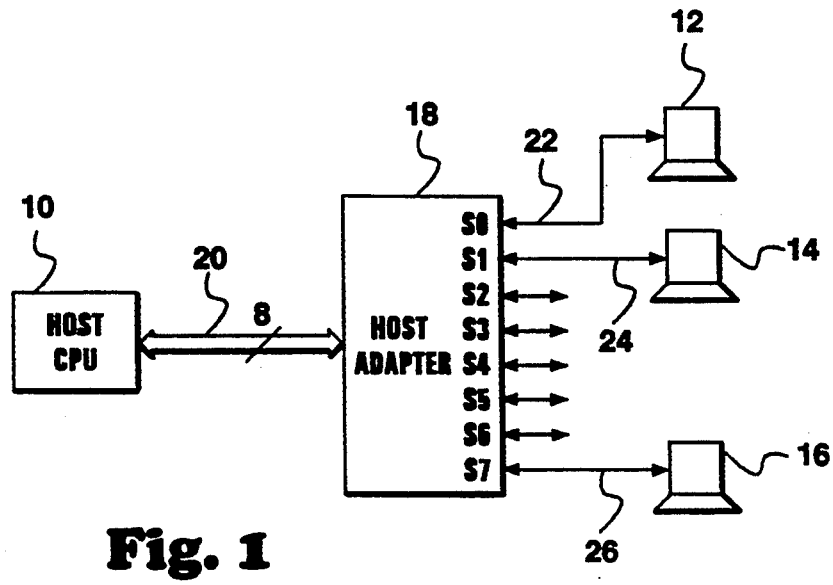
FIG. 1 is a block diagram of a multi-terminal system of the prior art.

Description of System Components
Description of the Host Adapter 18'
Configuration of the Host Adapter 18'
Communication Between the Host CPU 10 and the Host Adapter 18'
The Host Adapter 18' Functions
Automatic Data Concentrator 28 Detection
Host CPU 10 to Host Adapter 18' Command Protocol
Host Adapter 18' Configuration and Status Commands
TTY Port Commands
Direct High-Speed Channel Commands
Miscellaneous Commands
Device I/O Data Transfer Protocol
Description of the Data Concentrator 28
Addressed Packet Protocol
Flow Control
The Host Adapter 18' and the Data Concentrator 28 Addressed Packet Protocol Referring to FIG. 1, a block diagram of a multi-terminal data processing system of the prior art is shown, comprising a host central processing unit (CPU) 10, remote terminals 12, 14, and 16, and an interface logic unit or host adapter 18.

Generally speaking, the function of the host adapter 18 is to establish communications between the host CPU 10 and some number of remote devices. The host adapter 18 is necessary because often the host CPU 10 and a remote device, such as the terminal 12, may not communicate directly. As shown in FIG. 1, for example, the host CPU 10 communicates with peripheral devices via a parallel communications link, in particular, a system bus or data link 20 of the host CPU 10, while the remote devices 12, 14, and 16 communicate via the serial links 22, 24, and 26, respectively. Thus, the host adapter 18 is required to translate data from the parallel bus protocol of the host CPU 10 into the serial protocol recognized by the terminals 12, 14, and 16, and similarly to translate serial data from the terminals 12, 14, and 16 into the parallel data recognized by the host CPU 10.

Host adapters, such as the host adapter 18, are widely used in known data processing systems. Through the use of an appropriate host adapter, a remote device conforming to virtually any communications protocol may be coupled to any processor which may itself conform to any of various protocols. Host adapters may also perform functions other than logical translation; in FIG. 1, for example, the host adapter 18 additionally performs the role of a multiplexor, allowing the three terminals 12, 14, and 16 to be coupled to the data link 20 of the host CPU 10, in a tree-configuration.

Since data from each of the three terminals 12, 14, and 16 is received by the host CPU 10 via the data link 20, the communications system must provide some mechanism for preserving the unique identity of each terminal as seen by the host CPU 10. Accordingly, a communications protocol may be adopted which allows the host adapter 18 to identify the source and/or destination of data as it is exchanged between the devices and the host. For example, in one embodiment the host adapter 18 includes a three-bit field with all data routed to the host CPU 10 identifying the originating terminal of that data.

As shown, the system of FIG. 1 can include at most eight remote terminals, one for each of the serial ports S0 through S7 of the host adapter 18. If additional terminals were to be added to the system of FIG. 1, extensive hardware reconfiguration would be required. In particular, one known way to add another terminal is to replace the host adapter 18 with a host adapter having additional serial ports; this could also require the communications protocol used between the host CPU 10 and the host adapter 18 to be modified, since additional bits may be required to provide for the unique identification of terminals coupled to the host adapter 18. Additionally, software for the host CPU 10 must be modified to allow it to recognize the existence of the additional terminal or terminals thus accessible via the data link 20.

Description of System Components

Figure 2:
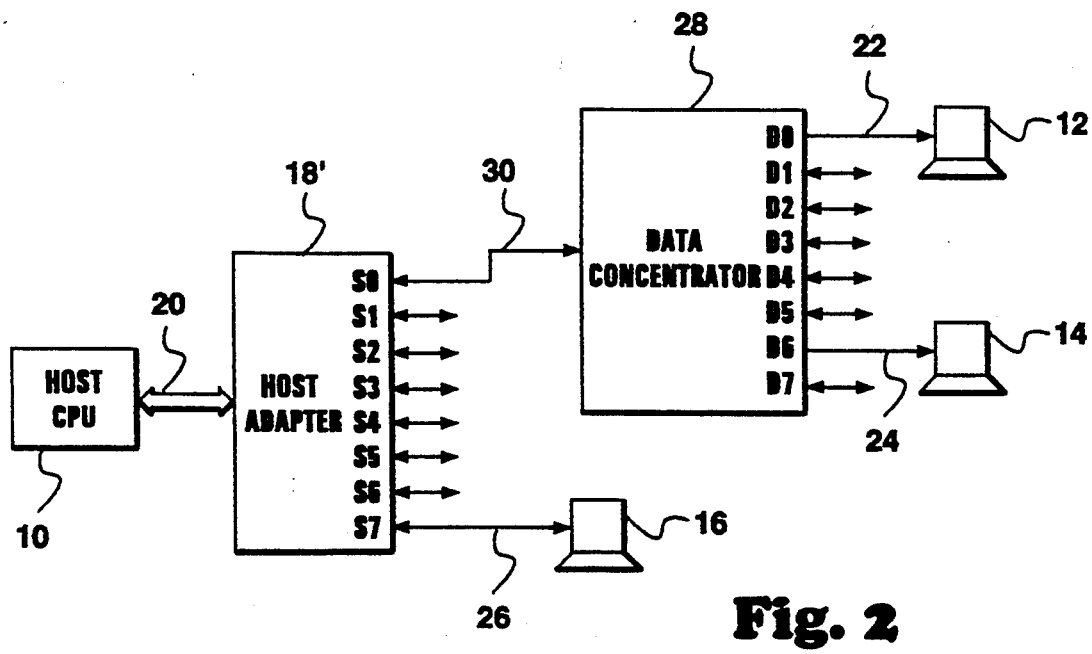
FIG. 2 is a block diagram of an expandable, multi-terminal system in accordance with one embodiment of the present invention.

Referring now to FIG. 2, a system in accordance with one embodiment of the present invention is shown in simplified block form, wherein components that are the same as in FIG. 1 have retained identical reference numerals.

In FIG. 2, a host adapter 18' is used to establish communication between the host CPU 10 and a plurality of remote terminals 12, 14, 16. The interconnection scheme shown in FIG. 2 may be characterized as a multiplexed, multi-level tree-configuration, the multiplexing being implemented in two stages: First, the host adapter 18' permits serial ports S1 through S7 to be coupled to the host CPU 10 via the shared data link 20, in a manner similar to that of FIG. 1. In the system of FIG. 2, however, a data concentrator 28 allows up to eight device ports D0 through D7 to be coupled to the host adapter 18' via a single, shared serial link 30 to serial port S0 of the host adapter 18'. Four of the serial ports S0 through S7 of the host adapter 18', for example ports S0 through S3, are capable of receiving input from a data concentrator 28, allowing up to 36 serial devices to be connected to the host CPU 10 via the host adapter 18'. As many as four host adapter boards similar to the host adapter 1B' may be installed in a typical computer system, allowing up to 144 serial devices to be interfaced with the host CPU 10.

Description of the Host Adapter 18'

Figure 3:
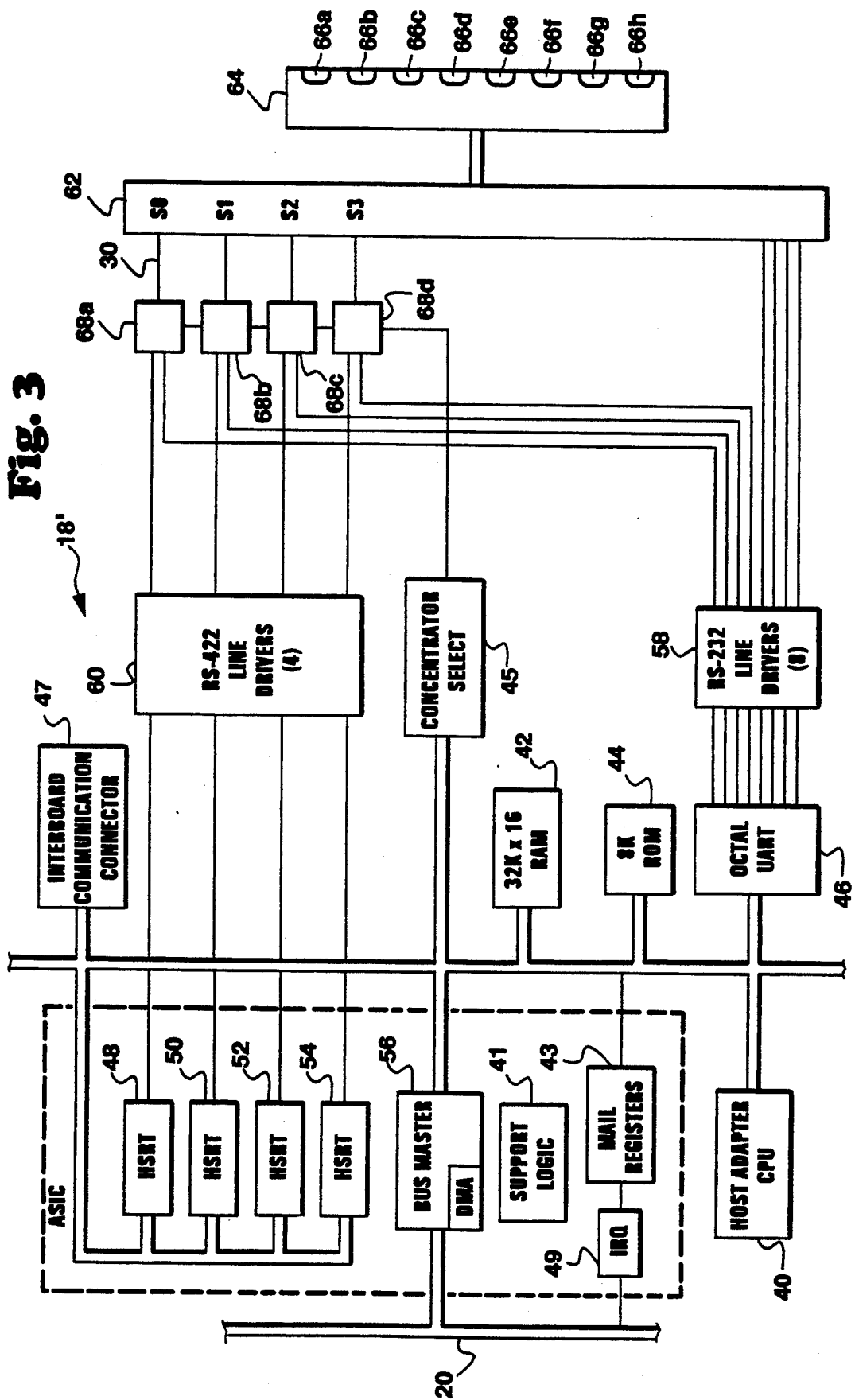
FIG. 3 is a block diagram of the host adapter according to the present invention as shown in the system of FIG. 2.

Referring now to FIG. 3, a block diagram showing the primary components of a particular implementation of the host adapter 18' of FIG. 2 is provided. It is to be understood that the particular implementation of the host adapter 18' shown in FIG. 3 is provided for illustrative purposes only, and is not intended to restrict the scope of the present invention to a specific implementation.

As shown in FIG. 3, the host adapter 18' comprises: a microprocessor, referred to as host adapter CPU 40, and microprocessor support and configuration logic 41; a 64 kbyte block of random access memory (RAM) 42; a set of general purpose 16-bit input/output (I/O) registers and status registers designated collectively as mail registers 43; interrupt request logic (IRQ) 49; an 8 kbyte block of read only memory (ROM) 44; an octal universal asynchronous receiver/transmitter (octal UART) 46; four high speed receiver/transmitters (HSRT's) 48, 50, 52, and 54; bus master control logic 56 which includes logic for direct memory access (DMA); eight RS-232 serial line drivers designated collectively as 58; four high speed RS-422 serial line drivers designated collectively as 60; interboard communications logic and connector 47; concentrator select logic 45; and relays 68a, 68b, 68c and 68d. In the presently disclosed embodiment of the invention, the bus master control logic 56, the four HSRT's 48, 50, 52, and 54, the microprocessor support logic 41, the mail registers 43 and the interrupt request logic (IRQ) 49 are conventionally implemented in a custom application specific integrated circuit (ASIC).

The bus master control logic 56 enables the host adapter CPU 40 to originate and accomplish DMA transfers into and out of host memory independent of the host CPU 10. The HSRT's 48, 50, 52, and 54 provide communications links to data concentrators such as the data concentrator 28 at up to 600 kbits per second. The high speed communications channels 30 feature an internal flow control mechanism to prevent data overrun between the host adapter 18' and data concentrators such as the data concentrator 28. Each of these components shall be hereinafter described in greater detail.

In the preferred embodiment of the invention, the host adapter 18' is designed to be received into an expansion slot of a host computer, such as the industry standard sixteen bit expansion slot of an IBM PC/AT or the like. Alternatively, the host adapter 18' may be designed to be received in an expansion slot conforming to the Extended Industry Standard Architecture (EISA) or Micro Channel Architecture (MCA) conventions, or may be otherwise connected to the host computer. As another alternative, many or most of the circuit comprising the host adapter 18' may be built into a motherboard or similar circuit board of a host computer.

Once installed in a computer, the host adapter 18' provides a high density 68-pin connector 62 at the backplane mounting bracket of the host computer. An external terminal connection fan-out device 64 connects to the connector 62, providing eight RJ-45 modular jacks 66a–66h, and permitting attachment of up to eight serial devices to the host adapter 18' via readily available cables, connectors, and adapters. As will be hereinafter described, four of the eight modular jacks, i.e. jacks 66a–66d in the fan-out device 64 (corresponding to serial ports S0 through S3, respectively, of the host adapter 18') may be used to connect up to four device concentrators, such as the data concentrator 28, to the host adapter 18'.

Again referring to FIG. 3, the host adapter CPU 40 is preferably a general purpose, high performance sixteen-bit CPU, such as a 16 MHz NEC uPD70136 device, manufactured by NEC Corp. A microprocessor faster than the 16 MHz NEC CPU may be employed if higher throughput capability is desired.

The host adapter 18' includes the 8 k ROM 44 which contains the boot code for the host adapter CPU 40. The position of the ROM 44 in the memory space of the host adapter CPU 40 is determined by the host adapter CPU 40's reset entry point. After reset, the host adapter CPU 40 begins execution at address FFFF0h, and from there it executes a jump to initialization and consistency check routines in the ROM 44. The ROM 44 may be a relatively low-speed device, so its resident control program is then copied in a conventional manner into a portion of the RAM 42 for faster execution. The resident control program provides the basic terminal communications capabilities; however, it also supports the downloading of program patches and additions, as well as completely distinct replacement control programs.

In the present embodiment of the invention, the octal UART 46 is a commercially available CD-180 device, manufactured by Cirrus Logic, which supports asynchronous communications at speeds up to 38.4K bits per second. The internal architecture of the UART 46 includes three reduced instruction set (RISC) processors for supporting the eight asynchronous lines' bit processing, as well as character buffering, flow control, and other character processing capabilities. In addition, the UART 46 provides character receive and transmit buffers for each of the eight asynchronous communications channels.

The host adapter 18' communicates with the host CPU 10 via the general purpose mail registers 43 which are conventionally mapped into sixteen bytes of the I/O address space of the host CPU 10 and sixteen bytes of the memory space of the adapter CPU 40. The host adapter 18' consumes no host RAM address space, so that unlike many multiport adapters of the prior art, the host adapter 18' is not a shared memory device.

If more than one host adapter, such as the host adapter 18', is installed in a system, pairs of boards may communicate small amounts of data and control information through the interboard communication connector 47. Up to four host adapter boards can be connected to the host computer, and each board has a board identification number (BID) from 1-4. The BID is determined by a four position slide switch located on each board. The bits 0-2 of memory location 10015h of the memory map of each host adapter CPU (described herein, see Table 10), contains a 3-bit code which corresponds to the BID, which identifies that board's BID to the host adapter CPU.

The odd BID numbered host adapter boards (1 and 3) can be configured as parent boards, and the even BID numbered host adapter boards (2 and 4) can be configured as a child board. Resources can be shared between boards 1 and 2 and between boards 3 and 4 by connecting these boards together with a ribbon cable (not shown) attached to the interboard communication connector 47 of each host adapter board. The paired board is accessed through the interboard communication registers at addresses 10100h and 10180h of the host adapter CPU memory map. Each board can receive 4 bits of data from, and send 4 bits of data to its paired board.

When so paired, the host adapter boards share an IRQ request and a DMA channel thus conserving system resources. The parent board has direct access to the DMA and IRQ channels on the ISA or EISA bus, while the child board does not. When the child board needs a DMA access or IRQ request, it sends signals to the parent board over the ribbon cable. The parent board, when idle, sends the request to the host system, and passes the host acknowledge from the host back to the child board.

Whenever the present owner (parent or child) finishes with its DMA cycle or has to give up the bus because of a refresh timeout, the next DMA cycle transfer is performed by the other requestor in the pair. For example, if the parent is currently doing its transfer over the DMA channel and must discontinue because of a refresh cycle, then the next DMA transfer will be performed by the child. Then, when the child is timed out by the refresh cycle, the next DMA transfer will be performed by the parent. Furthermore, if the parent finishes its transfer without being timed out by a refresh cycle, the child is granted the bus so that it continues with its transfer. Note that the bus is not surrendered to the host in this last transaction between the parent and the child. If, on the other hand, there are no requests from the 'other board' and the board that has the bus finishes one transfer without a timeout, it continues with the second transfer request from its holding registers without ever giving up the bus.

As described above, host adapters such as the host adapter 18' may be configured to operate independently or in pairs. Each host adapter or pair of host adapters requires a system interrupt level and a DMA channel. The host I/O base address, interrupt request (IRQ) level and DMA channel are software selectable. The IRQ level may be selected from IRQ's 10, 11, 3, 5, or none. The DMA channel may be selected from channels 3, 5, 6, or 7.

Communication of data between the host CPU 10 and the host adapter 18' occurs in a manner specific to the type of host CPU 10. Data is read from or written to the host CPU bus 20 by the host adapter 18' under control of the bus master control logic 56 and the host adapter CPU 40. For example, when the host CPU 10 desires to send data to the host adapter 18', the host CPU 10 will drive an appropriate I/O address on the address lines of the host bus 20. This address is detected by the support logic 41 and the data is accepted by the host adapter 18'. Conversely, when the host adapter 18' desires to send data to the host CPU 10, the bus master control logic 56 will obtain control of the host bus 20, drive the appropriate address signals on the address lines of the host bus 20, and subsequently provide the data on the data lines of the host bus 20.

The host adapter 18' communicates with asynchronous serial devices via industry standard RS-232 line drivers 58 coupled to the backplane connector 62. Alternatively, the host adapter 18' may communicate with the data concentrators 28 via industry standard RS-422 line drivers 60 coupled to the backplane connector 62. When the fanout device 64 is connected to the backplane connector 62, modular jacks 66e through 66h provide an RS-232 asynchronous, serial interface to which any RS-232-compatible device may be connected. Modular jacks 66a through 66d each selectively provide either an RS-232 asynchronous connection or an RS-422 connection, to which an RS-422-compatible synchronous device may be connected. The relays 68a through 68d perform a switching function controlled by concentrator select logic 45 to provide either the RS-422 or RS-232 interfaces at the modular connectors 66a through 66d, respectively, of the fanout device 64.

A data concentrator enable register is located at address 10200h of the memory map of the host adapter CPU 40 (see Table 10, below). A "1" written to any one of the four lower bits enables the corresponding data concentrator attached at the corresponding port S0–S3 of the host adapter 18'. The corresponding one of the relays 68a–68d is enabled by the concentrator select logic 45, thus disabling the corresponding RS-232 line driver 58 for that port. A "0" written to the concentrator enable register bit will enable the corresponding RS-232 58 for that port.

Configuration of the Host Adapter 18'

Configuration of the host adapter 18' is performed by the host adapter CPU 40 as commanded by the host CPU 10. For Industry Standard Architecture (ISA) systems, the board number selector switch (not shown in FIG. 3) must be set to uniquely identify each board in a system in order to configure the I/O base address.

The manner by which the I/O base address for the host adapter 18' is configured depends on whether the host adapter 18' is installed in an ISA system or an Extended ISA (EISA) system. If the host adapter 18' detects that it resides in an EISA system, the I/O base address is automatically configured within the EISA slot-specific I/O address range, as would be appreciated by one of ordinary skill in the computer field. Additionally, EISA product ID I/O registers are enabled so that the host adapter 18' appears to be an EISA board to the host CPU 10.

In an ISA system, the I/O base address is set up by the host CPU 10 as hereinafter described and may be any address in the host CPU 10's I/O address space which does not conflict with another device. After power-up or reset, the host CPU 10 writes to address 03FFh. The host CPU 10 writes a sequence of bytes to this register which forms a host adapter configuration command. This configuration command is a four-byte command which has the following format:

TABLE 1

| BYTE | DESCRIPTION |
|---|---|
| F0h | Command Byte |
| 00 | Logical Board Number (1–4), Physical ID (3, 5, 6, 7) |
| xx | low-order bits of I/O base address to set |
| yy | high-order bits of I/O base address to set |

These command bytes are read by the host adapter CPU 40 which in turn programs the bus master control logic 56 to set the requested I/O base address. Once the configuration command has been issued by the host CPU 10, the host CPU 10 may verify the presence of the host adapter 18' at the specified base address by issuing further commands. The host CPU 10 may repeat the configuration command sequence for up to four boards and by doing so, determine the number of host adapters such as 18' that are installed in the system.

Communication Between the Host CPU 10 and the Host Adapter 18'

As previously noted, communication between the host CPU 10 and the host adapter 18' in accordance with the present invention is supported by the mail registers 43 which are provided by the host adapter 18' and mapped into the I/O address space of the host CPU 10. The mail registers 43 are defined in Table 2 as follows:

TABLE 2

MAIL REGISTERS 43

| HOST I/O ADDRESS | MODE | REGISTER DEFINITION |
|---|---|---|
| I/O base address | read/write | R0, 16-bit Mailbox Register |
| I/O base address + 2 | read/write | R1, 16-bit Mailbox Register |
| I/O base address + 4 | read/write | R2, 16-bit Mailbox Register |
| I/O base address + 6 | read/write | R3, 16-bit Mailbox Register |
| I/O base address + 7 | read only | R4, 8-bit Mail Status Register |
| I/O base address + 8 | write only | R5, 8-bit Mail Command Register |

The mail registers 43 provide the interface between the host CPU 10 and the host adapter 18'. Each of the registers in the mail registers 43 is mapped into the host CPU 10's I/O address space according to Table 2. Referring to Table 2, the mail registers 43 include four 16-bit "mailbox" registers, an 8-bit "mail status" register, and an 8-bit "mail command" register. The mailbox registers are bidirectional, general-purpose data pathways between the host CPU 10 and the host adapter CPU 40.

The mail status register R4 holds eight bits which enable implementation of a software communication protocol between the host CPU 10 and the host adapter 18'. The bits of the mail status register R4 are defined in Table 3 as follows:

TABLE 3

MAIL STATUS REGISTER R4

| BIT | THE HOST CPU 10 INTERPRETATION |
|---|---|
| 0 | Mailbox register R0 input full |
| 1 | Mailbox register R1 input full |
| 2 | Mailbox register R2 input full |
| 3 | Mailbox register R3 input full |
| 4 | Mailbox register R0 output full |
| 5 | Mailbox register R1 output full |
| 6 | Mailbox register R2 output full |
| 7 | Mailbox register R3 output full |

The status bits in the mailbox status register R4 allow for the implementation of a software protocol for communication of information between the host CPU 10 and the host adapter CPU 40. For example, when bit 0 of the mail status register R4 is set to "1", this indicates that unread data from the host adapter CPU 40 exists in the mailbox register R0; when this data is read from mailbox register R0 by the host CPU 10, bit 0 of mail status register R4 is cleared to "0". When bit 4 of the mail status register R4 is set to "1", this indicates that unread data from the host CPU 10 exists in mailbox register R0; when this data is read from the mailbox register R0 by the host adapter CPU 40, bit 4 of the mail status register R4 is cleared to "0". This provides an indication that the mailbox register R0 may be written to without overwriting previously written data.

The hardware of the present invention supports the software communication protocol between the host CPU 10 and the host adapter 18' by updating the bits of the mail status register R4. In particular, when the host CPU 10 reads information from one of the mailbox registers R0-R3, host adapter logic (not shown) clears the respective input status bit 0-3 of the mail status register R4. Conversely, when the host adapter CPU 40 reads information from one of the mailbox registers R0-R3, host adapter logic clears the respective output status bit 4-7 in the mail status register R4.

The mail command register R5 provides a direct pathway for the host CPU 10 to elicit the attention of the host adapter CPU 40, or to clear the interrupt state from the host adapter 18'. The bits of mail command register R5 are defined in Table 4 as follows:

TABLE 4

| | MAIL COMMAND REGISTER R5 |
|---|---|
| BIT | EFFECT WHEN WRITTEN BY THE HOST CPU 10 |
| 0 | Resets all logic in host the adapter 18' |
| 1 | Interrupts the host adapter CPU 40 |
| 2-7 | not used |

All subsystems interfaces to the host adapter CPU 40 are memory mapped in a conventional manner. Such mapping allows the broadest selection of addressing modes and simplifies implementation of high-level language control programs to be executed by the host adapter CPU 40.

The RAM 42 is, in the preferred embodiment, a 64 kbyte, one wait state memory module. The placement of the RAM 42 in the memory map of the host adapter CPU 40 is determined by the fact that the host adapter CPU 40 uses the lower 1024 bytes of its address space to contain interrupt vector tables. Eight to twelve kbytes of the RAM 42 are used by the control program and data structures. Thirty-six kbytes of the RAM 42 are reserved for device input and output buffers. The remainder of the RAM 42 may be used for dynamic, high-demand burst input and output buffers.

As noted above, the microprocessor support logic 41, the bus master control logic 56, the HSRTs 48, 50, 52, and 54, the mail registers 43 and the IRQ logic 49 are implemented in an ASIC. The ASIC manages the I/O communications registers between the host CPU 10 and the host adapter 18'. There are six mail registers in the memory address space of the host adapter CPU 40 which correspond to the six mail registers 43 which are mapped in the host I/O address space. Mailbox registers R0' through R3' are 16-bit bidirectional data pathways between the host adapter CPU 40 and the host CPU 10. There are actually two unidirectional pathways (in opposite directions) associated with each of the general-purpose mailbox registers. A mail status register R4' provides flow control and status information for the first four mailbox registers R0' through R3'. The mail status register R4' is similar to the mail status register R4 for the host, although the mapping between input and output is reversed since the direction is relative to the host adapter CPU 40 instead of the host CPU 10. The definitions of the eight bits of mail status register R4' is set forth in Table 5 as follows:

TABLE 5

| | MAIL STATUS REGISTER R4' |
|---|---|
| BIT | HOST ADAPTER CPU 40 INTERPRETATION |
| 0 | Mailbox register R0 output full |
| 1 | Mailbox register R1 output full |
| 2 | Mailbox register R2 output full |
| 3 | Mailbox register R3 output full |
| 4 | Mailbox register R0 input full |
| 5 | Mailbox register R1 input full |
| 6 | Mailbox register R2 input full |

TABLE 5-continued

| | MAIL STATUS REGISTER R4' |
|---|---|
| BIT | HOST ADAPTER CPU 40 INTERPRETATION |
| 7 | Mailbox register R3 input full |

Similar to the mail status register R4, the contents of register R4' may be used to implement a software-based flow control and command passing protocol. No hardware enforcement of such a protocol is provided to prevent overwriting of data in mailbox registers R0' through R3'. A mail command register R5' provides the capability for the host adapter CPU 40 to generate an interrupt to the host CPU 10 or to clear interrupt state from the host. The mail command register R5' is bit-mapped as set forth in Table 6 as follows:

TABLE 6

| | MAIL COMMAND REGISTER R5' |
|---|---|
| BIT | EFFECT WHEN WRITTEN BY THE HOST ADAPTER CPU 40 |
| 0 | Causes an interrupt to the host CPU 10 |
| 1 | Indicates end-of-interrupt processing by the host adapter CPU 40 |
| 2-7 | not used |

A number of registers are associated with the programming of bus master transfers to or from memory associated with the host CPU 10. All bus master transfers are specified by the host adapter CPU 40. Four parameters must be specified for a transfer operation: The host CPU 10 address, the host adapter CPU 40 address, transfer byte count, and transfer direction. Both the host CPU 10 and the host adapter CPU 40 addresses must be specified as physical (RAM) addresses. Although the best performance is obtained on transfers from even addresses to even addresses, the bus master control logic 56 supports transfers to and from even and odd addresses.

A maximum of 64 kbytes may be transferred in one bus master request. Since only a limited number of words of data may be transferred each time the bus master control logic 56 is granted control of the host bus 20, a single transfer request submitted by the host adapter CPU 40 will result in one or more requests for the host bus 20 by the bus master control logic 56. This subdivision of block transfers and all other aspects of host bus arbitration are transparent to the host adapter CPU 40.

Once the transfer byte count, the host CPU 10 and the host adapter 18' memory addresses have been written to the proper registers in the bus master control logic 56, a write to a transfer control register initiates the transfer. The transfer control register is bit-mapped as set forth in Table 7 as follows:

TABLE 7

| | TRANSFER CONTROL REGISTER |
|---|---|
| BIT | INTERPRETATION |
| 0 | Transfer direction: (0 means from the host CPU 10 to the host adapter 18' 1 means from the host adapter 18' to the host CPU 10) |
| 1-6 | not used |
| 7 | Reset/Abort Transfer |

Setting the reset bit 7 of the transfer control register terminates any transfers in progress and resets the bus master control logic 56 completely.

The transfer specification registers are internally buffered by the bus master control logic 56 to allow loading of new transfer specification parameters while a transfer is in progress. A bus master status register is bit-mapped as set forth in Table 8 below to indicate the condition of the internal, transfer-in-progress parameter registers and the input transfer specification registers:

TABLE 8
BUS MASTER STATUS REGISTER

| BIT | INTERPRETATION |
|---|---|
| 0 | Transfer in progress |
| 1 | Transfer specification registers full |
| 2 | Parent-Child Mode |
| 3-7 | not used |

By polling the bus master status register, the host adapter CPU 40 may determine when a requested transfer has completed. A transfer queuing mechanism may be implemented in software. A current transfer remaining count register may also be read by the host adapter CPU 40.

As noted above, the HSRT's 48, 50, 52 and 54 are implemented in an ASIC on the host adapter 18'. Each of the HSRT's 48, 50, 52 and 54 are capable of communicating with a similar HSRT located on each data concentrator, such as the data concentrator 28. The implementation and method of communication between the host adapter 18' and the data concentrator 28 through the HSRT's will be discussed thoroughly below in the section describing the data concentrator 28.

The complete memory map of the host adapter CPU 40 is set forth in Table 10:

TABLE 10
HOST ADAPTER CPU 40 MEMORY MAP

| ADDRESS (HEX) | LENGTH (BYTES) | MODE | DESCRIPTION OF ITEM |
|---|---|---|---|
| RAM 42 | | | |
| 00000 | 64k | read/write | RAM (32k words) |
| ASIC | | | |
| 10000 | 2 | read/write | Mailbox register R0 |
| 10002 | 2 | read/write | Mailbox register R1 |
| 10004 | 2 | read/write | Mailbox register R2 |
| 10006 | 2 | read/write | Mailbox register R3 |
| 10008 | 1 | read only | Mail Status register R4 |
| 10009 | 1 | write only | Mail Command register R5 |
| 1000A | 2 | read/write | Programmable timer count register |
| 1000C | 2 | read only | Programmable host I/O base address |
| 1000E | 2 | write only | Programmable initial I/O address |
| 10010 | 1 | write only | Interrupt vector number for octal UART 46- Receive Buffer full |
| 10011 | 1 | write only | Interrupt vector number for octal UART 46- Transmit Buffer empty |
| 10012 | 1 | write only | Interrupt vector number for octal UART 46- Modem status change |
| 10013 | 1 | write only | Interrupt vector number for timer tick |
| 10014 | 1 | write only | Interrupt vector host to host adapter CPU 40 |
| 10015 | 1 | write only bit map | Board ID (switch position) |
| | | 7 | 1 = EISA System Detected |
| | | 6 | 1 = EISA Override Enabled |
| | | 5-3 | 0 = Bus Master Control logic 56 Version 0 |
| | | 2-0 | Board Id bits: 011 = board 1 101 = board 2 111 = board 3 110 = board 4 |
| 10016 | 10 | — | Test Register for hardware |
| 10018 | 1 | read/write | Bus Master Timer |
| 1001A | 1 | read/write | EISA revision byte |
| BUS MASTER 56 | | | |
| 10020 | 2 | read/write | Host Address A2 (lower 16 bits) |
| 10022 | 1 | write only | Host Address A0 (upper 8 bits) |
| 10023 | 1 | — | not used |
| 10024 | 2 | read/write | host adapter CPU 40 address A2 (lower 16 bits) |
| 10026 | 1 | — | Reserved |
| 10027 | 1 | — | not used |
| 10028 | 2 | write only | Transfer Count |
| 1002A | 1 | write only | Transfer Control register |
| 1002B | 1 | read only | Bus Master Status register |
| 1002C | 2 | read only | Transfer Remaining Count register |
| 1002E | 1 | read/write bit map | Parent-Child Designation register |
| | | 0 | 1 = Child Board (default) 0 = Parent Board |
| | | 1 | 1 = EISA override enabled |
| | | 7-2 | Reserved |
| HSRTs 48, 50, 52 and 54 | | | |
| 10040 | 2 | read/write | HSRT 48 data |
| 10042 | 2 | read/write | HSRT 50 data |
| 10044 | 2 | read/write | HSRT 52 data |
| 10046 | 2 | read/write | HSRT 54 data |
| 10048 | 1 | read only | HSRT 48 status |
| 10049 | 1 | read only | HSRT 50 status |
| 1004A | 1 | read only | HSRT 52 status |
| 1004B | 1 | read only | HSRT 54 status |
| 1004C | 20 | — | not used |
| 10060 | 32 | — | not used |
| DISCRETE | | | |
| 10080 | 1 | write only bit map | DMA and interrupt program register |
| | | 7 | 1 = Select Host DMA CH7 |
| | | 6 | 1 = Select Host DMA CH6 |
| | | 5 | 1 = Select Host DMA CH5 |
| | | 4 | 1 = Select Host DMA CH3 |
| | | 3 | 1 = Select Host IRQ 3 |
| | | 2 | 1 = select Host IRQ 5 |
| | | 1 | 1 = Select Host IRQ 10 |
| | | 0 | 1 = select Host IRQ 11 |
| 10081 | 127 | — | not used |
| 10100 | 1 | read only | Interboard communications 47 |
| 10101 | 127 | — | not used |
| 10180 | 1 | write only | Interboard communications 47 |
| 10181 | 127 | — | not used |
| 10200 | 1 | write only bit map | Data concentrator 28 mode enable |
| | | 7-4 | Not used |
| | | 3 | 1 = Enable HSRT 48 Port S0 |
| | | 2 | 1 = Enable HSRT 50 |

TABLE 10-continued

HOST ADAPTER CPU 40 MEMORY MAP

| ADDRESS (HEX) | LENGTH (BYTES) | MODE | DESCRIPTION OF ITEM |
|---|---|---|---|
| | | 1 | Prot S1<br>1 = Enable HSRT 52 Port S2 |
| | | 0 | 1 = Enable HSRT 54 Port S3 |
| 10210 | 127 | — | not used |
| 10280 | 1 | write only | Data terminal ready |
| 10281 | 127 | — | not used |
| 10300 | 128 | read/write | Octal UART 46 |
| 10380 | 973952 | — | not used |
| ROM 44 | | | |
| FE000 | 8k | read only | Boot strap entry point |
| FFFF0 | 5 | read only | Reset entry point, jump to FE000h |
| FFFF5 | 11 | read only | ROM 44 version and date |

The Host Adapter 18' Functions

The code present in the ROM 44 performs several types of functions. The code in the ROM 44 includes the reset entry point and adapter initialization code, as well as a communications and terminal I/O control program which interfaces to host device drivers executed by the host CPU 10. Diagnostic routines are also included in the ROM 44 and may be invoked to test various subsystems of the host adapter 18' from a stand-alone diagnostic program or to trouble-shoot the host adapter 18' during normal operation.

The first function performed by the host adapter CPU 40 following reset is a consistency check of subsystems of the host adapter 18' The host adapter CPU 40 computes a checksum of the contents of the ROM 44 and verifies the checksum with a preset value stored in the ROM 44. The host adapter CPU 40 sets the host I/O initialization address and checks bus master register values for expected reset values.

Next, the host adapter CPU 40 performs write and read verify tests on the RAM 42, copies portions of code stored in the ROM 44 into the RAM 42 for faster execution, and sets up a service routine address for the host command interrupt. An integrity check completion status is then written to the mailbox register R0.

Automatic Data Concentrator 28 Detection

As part of the initialization process and periodically thereafter, the host adapter CPU 40 uses the procedure described below to determine which, if any, of the ports S0–S3 on the adapter board fan-out device 64 are coupled to functioning data concentrators, such as the data concentrator 28 in FIG. 3. Four ports S0 through S3 are switchable between RS-232 asynchronous mode for connection to serial devices and RS-422 synchronous mode for connection to data concentrators. The switching capability is performed by the data concentrator select logic 45 and the relays 68a–68d. Ports S0 through S3 power-up in RS-232 mode, and remain so configured unless a data concentrator is positively detected.

Figure 4:
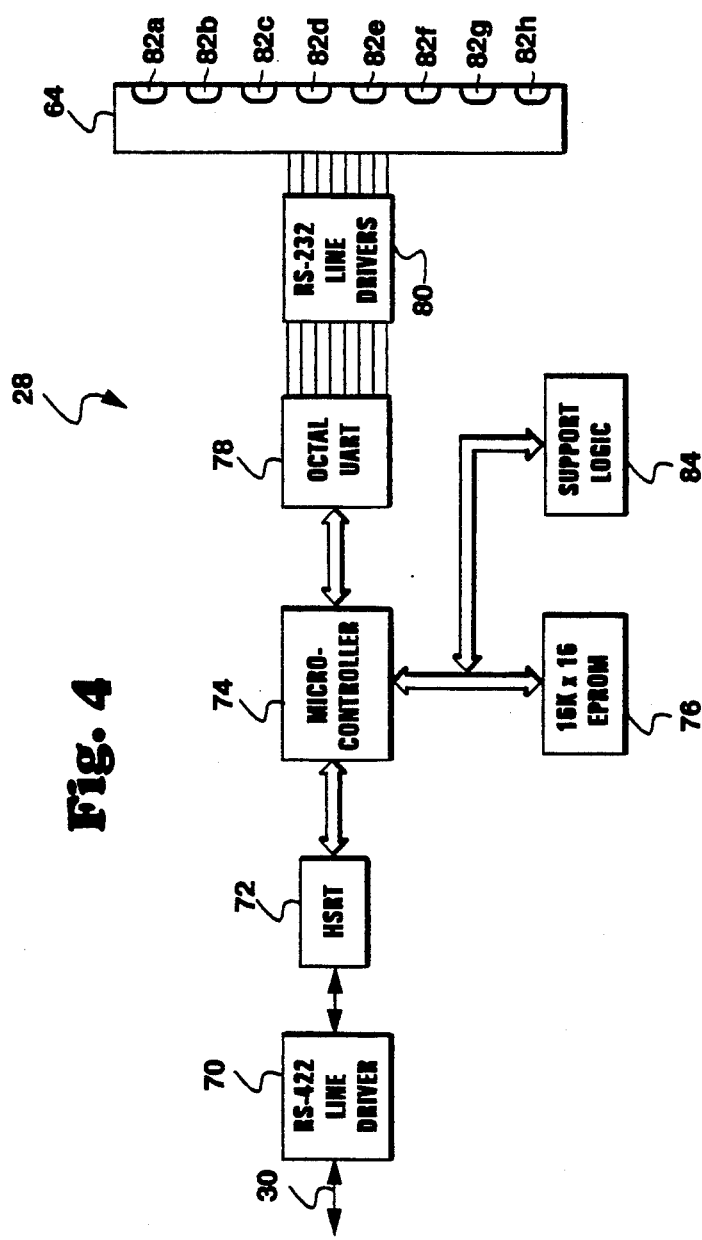
FIG. 4 is a block diagram of the data concentrator in the system of FIG. 2.

In order make its presence known to host adapter 18', the data concentrator 28 of FIG. 4 will, upon power-up and periodically thereafter, send an ID response packet to the host adapter 18 Since flow control is embedded in the synchronous link between the data concentrator 28 and the host adapter 18', data to be sent by the microcontroller 74 (FIG. 4) of the data concentrator 28 will be placed in the transmit register of the HSRT 72. The data will remain in the HSRT 72, pending transmission, until the RS-422 receivers 60 (see FIG. 3) are enabled.

On power-up or reset, the host adapter CPU 40 enables the RS-422 receivers 60 for a short period of time. If data concentrators, such as the data concentrator 28 of FIG. 4, are connected and powered up, the host adapter CPU 40 will receive data stored in the HSRT 72 and thereby detect the presence of the data concentrator 28 in a passive manner, without itself transmitting data which could result in "garbage" data being received by a terminal, printer, or other serial device which may be connected to ports S0 through S3. Any of the configurable ports S0 through S3 which may not be determined to be connected to a data concentrator will be returned to RS-232 mode. Periodically, during normal operation and during open processing on a port which may be connected to a data concentrator, the host adapter CPU 40 will temporarily enable the RS-422 receivers 60 in receive mode and check for valid data reception.

In the presently disclosed embodiment, the preferred method of power-up is that all the data concentrators be connected and powered-up prior to booting the host system. It is also preferred that reconfiguration of connections to the data concentrators not be undertaken during normal operation of the host CPU 10.

HOST CPU 10 TO HOST ADAPTER 18' COMMAND PROTOCOL

The host CPU 10 can receive information and send commands to the host adapter 18' through a command protocol in accordance with the preferred embodiment of the invention. This communication link allows the host to receive version, status and configuration information as well as set DMA channels and IRQ's, initialize data structures, and configure the high speed channels and the remote devices coupled through the host adapter 18'.

For example, the device drivers of the host may not directly access the remote devices, such as the devices 12, 14 and 16, but must send commands to the host adapter 18' so that the host adapter 18' can configure the remote devices 12, 14 and 16. The device drivers must work in conjunction with a software configuration and database management utility as well as with the host adapter 18' to properly configure each remote device coupled through the host adapter 18'. The management utility configures the operating system of the host which builds and maintains a cross-reference data file comprising the unique identity and configuration of each remote device. The data file is maintained on the host system, such as on a hard disk of the host computer. The host operating system uses the cross-reference data file to control the device drivers to establish the configuration of the remote devices. The device drivers send configuration information through commands pursuant to the command protocol, and the host adapter 18' configures each device either directly, or indirectly through the data concentrators pursuant to the commands sent by the device drivers. The host adapter 18' also assigns unique identifiers to each remote device, and these identifiers are passed back to the host and are kept in the cross-reference data file.

In accordance with the presently disclosed embodiment of the invention, commands are passed from the host CPU 10 to the host adapter 18' via the mailbox register R0. The mailbox registers R1, R2, and R3 are used for passing command-specific parameters. Commands are specified by the lower eight bits of register R0. For some commands, the upper eight bits of register R0 contain additional command parameters or modifiers.

Figure 5:
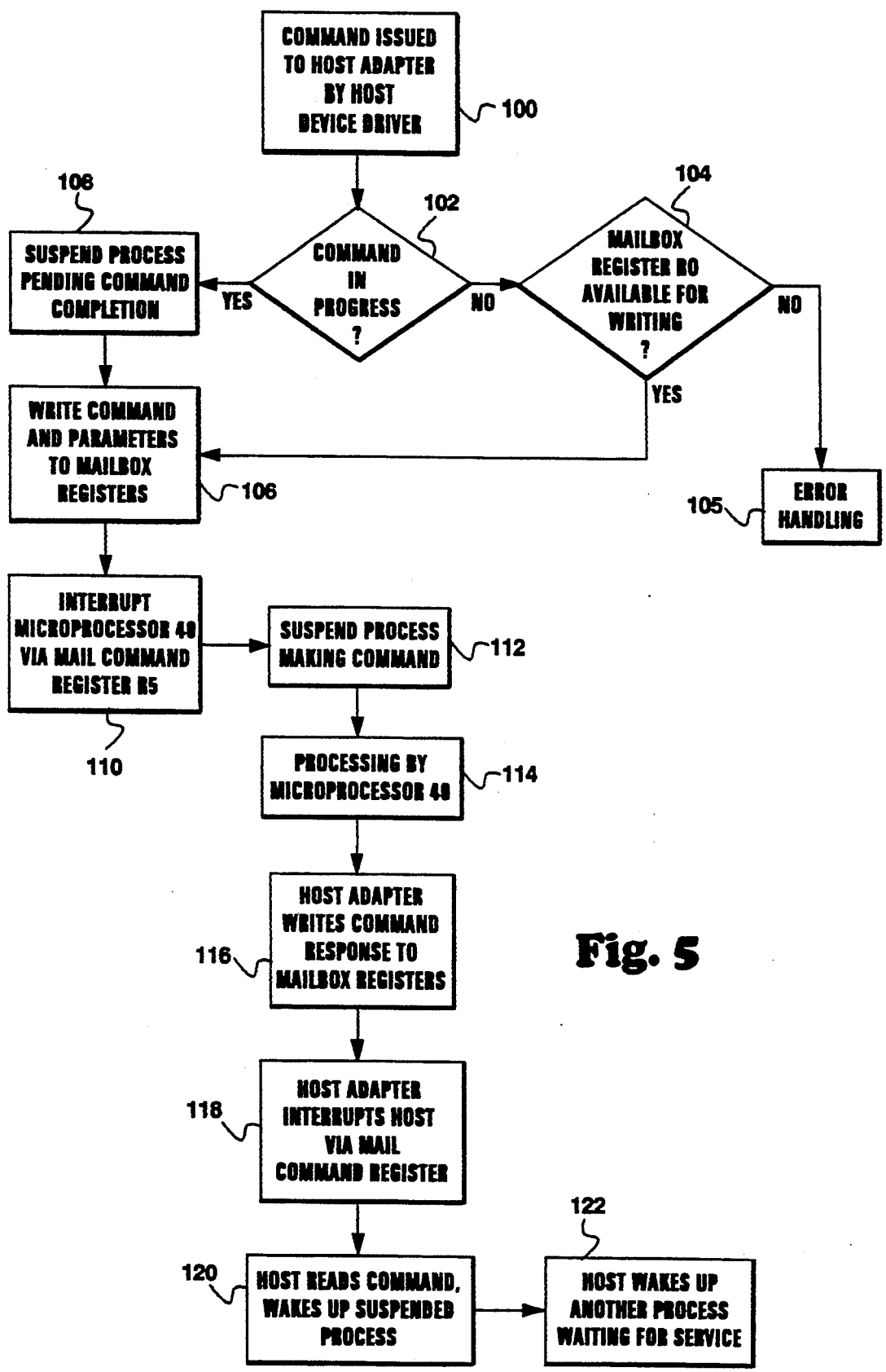
FIG. 5 is a flow chart illustrating the sequence of events which occur when the host adapter processes commands from the host computer.

Most commands are handled synchronously, such that the host adapter CPU 18' completes all processing of a command before beginning to process a next command. FIG. 5 illustrates in flowchart form the sequence of events which occur during the processing of a host command. Node 100 in the flowchart of FIG. 5 represents the point where a user process executed by the host CPU 10 issues a system call which requires a command to be issued to the host adapter 18' by the host device driver. Control of the host CPU 10 is subsequently turned over to the device driver.

The device driver first determines whether a command is currently being processed by the host adapter 18', as represented in decision node 102 of FIG. 5. If a command is not already in progress, the host device driver waits for the mailbox register R0 to be available for writing; this step is represented by node 104 in FIG. 5. If the device driver is sequencing commands to the host adapter 18, the mailbox register R0 should be available immediately. If the mailbox register R0 is not available immediately, an error or exceptional condition in the driver or the host adapter 18' has occurred, and an error handling sequence is executed as represented by node 105 of FIG. 5. If the mailbox register R0 is available, the device driver writes the command and associated parameters into the mailbox registers R0-R3; this stage is represented by node 106.

Returning to the node 102 of FIG. 5, if a command is currently being processed by the host adapter 18', the user process which issued the command is suspended, as represented by node 108 in FIG. 5. As shall be hereinafter described, when a command is completed by the host adapter 18' and the results received by the device driver in the mailbox registers R0-R3, the device driver then "wakes up" a process, if any, that is waiting for command completion at the node 108 of the flow diagram of FIG. 5. When the process is awakened, the device driver writes the command and associated parameters, as shown in node 106.

After the command and parameters have been written into the mailbox registers R0-R3, the device driver interrupts the host adapter CPU 40 by writing to the mail command register R5; this is represented by node 110 of FIG. 5. In the node 110, the device driver sets bit 1 in the mail command register R5 which alerts the host adapter 18' that it should interrupt the host CPU 40 after the command written to the mailbox register R0 in the node 106 has been processed.

Next, the device driver suspends the process which issued the command pending command completion, as shown in node 112 of FIG. 5. Nodes 114, 116, and 118 of FIG. 5 represent processing steps taken by the host adapter CPU 40. First, in the node 114, the host adapter CPU 40 executes the command identified in the mailbox register R0, and the command response is written to the mailbox registers as shown in the node 116. Then the host adapter CPU 40 causes an interrupt to the host CPU 10 by writing to the mail command register R5', as represented by the node 118.

When the host CPU 10 receives the interrupt, the device driver wakes up the process suspended in the node 112, as represented by node 120. When this process resumes, it will detect that the command has been completed. If another process is awaiting the completion of command processing as suspended in the node 108, the device driver now wakes up that process, as represented by node 122, and the awakened process should find the mailbox register R0 now available for writing.

When configured to operate without host interrupts, the processing done by the interrupt service routine in the sequence of events illustrated in FIG. 5 would be performed by a periodic polling routine. This would have the effect of limiting the number of commands processed by the adapter in a given period of time according to the frequency of the polling routine.

A few commands require an external event for completion. The sequence for handling such commands would be similar to that described with reference to FIG. 5 above, except that when the host CPU 10 is interrupted following the submission of an asynchronous command, the response from the host adapter 18' indicates that the command is in progress. Subsequently, on actual command completion, the host CPU 10 will be interrupted again. Asynchronous command parameters include a command reference handle which is passed back on command completion. The host device uses this reference handle to identify which asynchronous command has completed and resumes the appropriate process.

The command set for the host adapter 18' is set forth in Table 11 below:

TABLE 11

| HOST ADAPTER 18' COMMAND SET | |
|---|---|
| COMMAND VALUE | FUNCTION |
| 0000 | Get host adapter 18' version information |
| 0001 | Get host adapter 18' extended information |
| 0002 | Set DMA channel and IRQ |
| 0003 | Initialize transfer data structures |
| 0004 | Yield transfer data structures |
| 0005 | Get host adapter 18' status |
| 0006 | Get host adapter 18'/data concentrator 28 port configuration |
| nn07 | Open tty port |
| nn08 | Close tty port |
| nn09 | Set tty port mode |
| nn0A | Set tty port extended mode |
| nn0B | Transmit break |
| nn0C | Flush tty port input |
| nn0D | Flush tty port output |
| nn0E | Flush tty port input and output |
| nn0F | Wait for tty port output to drain |
| nn10 | Wait for tty port modem status change |
| nn11 | Cancel tty port wait command |
| nn12 | Get tty port status |
| 0013 | Open direct high speed channel |
| 0014 | Close direct high speed channel |
| 0015 | Reset direct high speed channel |
| 0016 | Get direct high speed channel status |
| 0017 | Shutdown all ports and channels |
| nn18 | Execute diagnostic routine |
| 0019 | Peek host adapter RAM 42 |
| 001A | Poke host adapter RAM 42 |
| 001B | Load new executable image |

Many commands in Table 11 above, such as those which change or return a port status, require very little processing by the host adapter 18'. During command processing by the host adapter 18', polling of the HSRT's 48, 50, 52, and 54 is suspended. In general, the number and frequency of commands issued in the host adapter 18' by the host device driver is negligible compared to the amount of transmitted and received data. This transmitted and received data is not passed via the mailbox command registers, but is directly bus mastered by the host adapter 18' to and from the host CPU 10 memory as will be described in the section entitled "Device I/O Data Transfer Protocol", below.

Host Adapter 18' Configuration and Status Commands

Several of the commands in Table 11 allow the host adapter 18' to be configured and provide version information to the host device driver. The commands which return the host adapter 18' information are intended to insulate the host device driver from changes to the host adapter 18' hardware or firmware in future versions. Radical changes to the host adapter 18' may not allow the host device driver to be completely insulated, but at least those commands will allow the device driver to detect and perhaps adapt to changes in the host adapter 18'.

For example, a future version of the host adapter 18' might support a larger number of ports. This would have minimal impact on a driver which queried the host adapter 18' to determine the maximum port number for a particular adapter. However, a later version of the host adapter 18' might include support for additional commands. If such an adapter maintained backwards compatibility, a host device driver written for an earlier version would function properly with the new adapter. Newer versions of the driver could take advantage of the additional commands since it could register their availability through a request to the host adapter 18'.

The following is a description of each of the host adapter 18' configuration and status commands supported in the presently disclosed embodiment of the invention:

Get Host Adapter 18' Version Information Command

This command allows the host device driver to obtain firmware and the host adapter 18' hardware version information. This may allow the device driver to support future versions of the host adapter 18' which provide additional functionality or features. This command has one parameter:

| R0 | Get host adapter version information command |
|---|---|

The command returns the following information:

| R0 | command completion status |
|---|---|
| R1 | host adapter hardware revision |
| R2 | host adapter firmware revision |
| R3 | host adapter RAM and number of connectors |

Get Host Adapter 18' Extended Information Command

This command allows the host device driver to obtain more information about the host adapter 18'. This may allow the device driver to support future versions of the adapter which provide additional functionality or features. This command has one parameter:

| R0 | Get host adapter 18' extended information command |
|---|---|

The command returns the following information:

| R0 | command completion status |
|---|---|

-continued

| R1 | DMA channels supported bit-map |
|---|---|
| R2 | IRQ levels supported |
| R3 | current configuration: |
|    | DMA channel (high byte) |
|    | IRQ level (low byte) |

Set DMA Channel and IRQ Command

This command configures the interrupt request (IRQ) and DMA channel to be used by the host adapter 18'. The command requires three parameters:

| R0 | Set DMA channel and IRQ |
|---|---|
| R1 | DMA select (3, 5, 6, 7) |
| R2 | IRQ select (−1, 3, 5, 10, 11) |

The host adapter 18' must have a DMA channel reserved for its use; however, it can operate in a polled environment without and does not require a host interrupt. If the IRQ select value is (−1), the host adapter 18' will never interrupt the host CPU 10 If either the DMA or IRQ select values are invalid, an error code is returned to the host CPU 10. Otherwise a successful completion status is returned:

| R0 | command completion status |
|---|---|

Initialize Transfer Data Structure Command

The host device driver allocates several data structures in host RAM for use by the host adapter 18' firmware. The significance of these data structures shall be hereinafter described. This command is used to pass the address of the data structure to the host adapter 18'. The command has three parameters:

| R0 | Initialize transfer data structures command |
|---|---|
| R1, R2 | Physical host RAM address of transfer control structure |
| R3 | Size, in bytes, of the transfer control data structure |

If the transfer control data structure size or contents are incompatible with the firmware revision of the host adapter 18', an error code is returned to the host CPU 10. Otherwise, a successful completion status is returned:

| R0 | command completion status |
|---|---|

Yield Transfer Data Structure Indication

Periodically, the host adapter 18' yields use of the transfer data structure to the host device driver. The host CPU 10 must inform the host adapter 18' when it is through processing these data structures. This indication has one parameter:

| R0 | Yield transfer data structures indication |
|---|---|

This is not a command to the host adapter 18', but rather an indication. As such, no completion status is generated by the host adapter 18'.

Get Host adapter 18' Status Command

This command returns high-level host adapter 18' status information. This command has one parameter:

| R0 | Get host adapter status command |
|---|---|

The following information is returned:

| R0 | command completion status |
|---|---|
| R1,R2,R3 | host adapter 18' status |

Get Host Adapter 18'/Data Concentrator 28 Configuration Command

This command returns configuration information regarding the asynchronous port and high-speed channel connectors. The command has two parameters:

| R0 | Get host adapter 18'/data concentrator 28 configuration command |
|---|---|
| R1 | connector number |

The following information is returned:

| R0 | command completion status |
|---|---|
| R1 | connection type/status bit map: |
| | Bit    Definition |
| | 0001h    RS-232 asynchronous capable connector |
| | 0002h    High-speed capable connector |
| | 0004h    RS-232 asynchronous mode enabled |
| | 0008h    High-speed mode enabled |
| | 0010h    Data concentrator 28 attached |
| | FFE0h    not used |
| R2 | number of RS-232 asynchronous ports supported (directly or through a data concentrator) |

TTY Port Commands

The following is a description of the commands which allow the host device driver to control local and remote RS-232 ports. The open command establishes a connection between I/O buffers and data structures in the device driver and corresponding data structures on the host adapter 18'. The close command breaks this connection and disables data transmission or reception on a port. Other TTY port commands support host device driver requirements. For all port commands, the upper eight bits of the mailbox register R0 contains the port identification number.

Open TTY Port

This command changes the state of a specified port from closed to open. The command has two parameters:

| R0 | command completion status |
|---|---|
| R1, R2 | adapter reference identifier |

The host reference identifier is used in subsequent communications with the host device driver. In operation, this is intended to be a pointer to a data structure in the host RAM which is related to a specified port. Its value and usage by the host CPU 10 are transparent to the host adapter 18'. Likewise the adapter reference handle is used by the host device driver in subsequent communications with the host adapter 18'.

This command is called only for the first open of a TTY device. The mapping between the file system TTY device node number and the port number on the host adapter 18' is maintained by the host device driver.

Close TTY Port Command

This command changes the state of a specified port from open to closed. In the closed state, a port can neither send nor receive data and modem control lines are placed in inhibited state. The port operating parameters are reset to default values. The command has one parameter:

| R0 | Port number/Close TTY port command |
|---|---|

The port number must be between zero and the maximum number of ports supported by the host adapter 18'. If the port number is invalid or the port is already closed, an error code is returned to the host; otherwise a successful completion status is returned.

Set TTY Port Mode Command

This command allows the host CPU 10 to set up a number of TTY port operating parameters in a format which is compatible with terminal data structures, such as UNIX Standard TERMIO data structures. User processes set TTY input, output and control modes for a TTY. The bit-mapped control values for these modes may be passed directly to the host adapter 18' for processing, although some modes are not applicable for handling on the host adapter 18'.

Although this command may be optimized for a UNIX device driver, it provides a concise method for passing configuration information to the host adapter 18' which may be useful in other operating environments. As required, other commands to set TTY line parameters and operating modes may be added to the command set supported by the presently disclosed embodiment of the invention. One such set of commands might provide a level 8250 UART command register compatibility.

The "Set TTY Port Mode" command has four parameters:

| R0 | Port number/Set TTY Port Mode Command |
|---|---|
| R1 | Input mode descriptor |
| R2 | Output mode descriptor |
| R3 | Control mode descriptor |

When a port is opened, its mode is initialized to a system default mode setting. This command may be used to specify the default open port mode by specifying the port number as −1 (0xFF).

The port number must be between zero and the maximum number of ports supported by the host adapter 18', or must be the special value to set the default input mode setting. If the port number is invalid or the port is closed, an error code is returned to the host. Otherwise, a successful completion status is returned:

| R0 | command completion status |
|---|---|

TTY Port Input Mode Descriptor

This descriptor configures received character processing for the specified port and is bit-mapped as follows:

| Bit | Definition |
|---|---|
| 0001 | Ignore break condition |
| 0002 | Interrupt on break reception |
| 0004 | Ignore characters received with parity errors |
| 0008 | Mark parity errors |
| 0010 | Enable input parity checking |
| 0020 | Strip characters to seven bits |
| 0040 | Map NL to CR on input |
| 0080 | Ignore CR on input |
| 0100 | Map CR to NL on input |
| 0200 | Map uppercase to lowercase on input |
| 0400 | Enable start/stop output control |
| 0800 | Enable any character to restart output |
| 1000 | Enable start/stop input control |

TTY Port Output Mode Descriptor

The output mode descriptor configures the transmitted character processing for the specified port and is bit-mapped as follows:

| Bit | Definition |
|---|---|
| 0001 | Post-process output |
| 0002 | Map lowercase to uppercase on output |
| 0004 | Map NL to CR-NL on output |
| 0008 | Map CR to NL on output |
| 0010 | No CR output at column 0 |
| 0020 | NL performs CR function |
| 0040 | Use fill characters for delay |
| 0080 | Use DEL for fill, else NUL |
| 0100 | Select newline delay |
| 0600 | Select carriage return delay |
| 1800 | Select horizontal tab delay |
| 2000 | Select backspace delay |
| 4000 | Select vertical tab delay |
| 8000 | Select form feed delay |

TYY Port Mode Descriptor

This descriptor configures the hardware control for the specified port and is bit-mapped as follows:

| Bit | Definition | |
|---|---|---|
| 000F | Select baud rate | |
| | 0000 | Hang up |
| | 0001 | 50 |
| | 0002 | 75 |
| | 0003 | 110 |
| | 0004 | 134.5 |
| | 0005 | 150 |
| | 0006 | 200 |
| | 0007 | 300 |
| | 0008 | 600 |
| | 0009 | 1200 |
| | 000A | 1800 |
| | 000B | 2400 |
| | 000C | 4800 |
| | 000D | 9600 |
| | 000E | 19200 |
| | 000F | 38400 |
| 0030 | Select character size | |
| | 0000 | 5 bits |
| | 0010 | 6 bits |
| | 0020 | 7 bits |
| | 0030 | 8 bits |
| 0040 | Select two stop bits, else one | |
| 0080 | Enable receiver | |
| 00100 | Enable parity | |

| Bit | Definition |
|---|---|
| 0200 | Select odd parity, else even |
| 0400 | Hang up on last close |
| 0800 | Select local line mode, else dial-up |
| 1000 | Block layer output |
| 2000 | Enable CTS protocol |
| 4000 | Enable RTS signalling |

Set TTY Port Extended Mode Command

This command sets up the specified port for other operating modes such as internal loop-back and alternative hardware flow signalling protocols which are not configurable through the "Set TTY Port Mode" command. The command has two or three parameters:

| | | |
|---|---|---|
| R0 | Port number/Set TTY port extended mode command | |
| R1 | Mode to Set | |
| | 0 | Internal loop-back |
| | 1 | Alternative flow control as specified by R2 |
| | 2 | Suspend transmit and receive |
| | 3 | Resume transmit and receive |
| R2 | Alternative flow control to set (mode 1) | |
| | 0 | None |
| | 1 | DSR flow control |

The internal loop-back mode enables a diagnostic mode of the UART 46 for the specified port which echoes transmitted data back as received data. The alternative flow controls provide support for various flow control signalling conventions not supported by the standard TTY mode settings.

The suspend and resume command modes allow direct flow control manipulation under process control. On receipt of a suspend command the host adapter 18' will stop transmitting and issue a request to the device to stop transmitting. The port will remain in this state until a resume command is received or the port is closed. A small amount of data buffered in the data concentrator 28 for the specified port may be transmitted or received event after the suspend command has been processed.

The port number must be between zero and the maximum number of ports supported by the host adapter 18'. If the port number is invalid or the port is closed, an error code is returned to the host CPU 10. Otherwise a successful completion status is returned:

| R0 | command completion status |
|---|---|

Transmit Break Command

This command causes a break to be transmitted on the specified port. The command has one parameter:

| R0 | Port number/Transmit break command |
|---|---|

The port number must be between zero and the maximum number of ports supported by the host adapter 18'. If the port number is invalid or the port is closed, an error code is returned to the host CPU 10. Otherwise, a successful completion status is returned:

| R0 | command completion status |
|---|---|

Flush TTY Port Input Command

This command disposes of any received data for the specified port which remains buffered on the host adapter 18' and the data concentrator 28. The command has one parameter:

| R0 | Port number/Flush TTY port input command |
|---|---|

The port number must be between zero and the maximum number of port support by host adapter 18'. If the port number is invalid or the port is closed, an error code is returned. Otherwise a successful completion status is returned:

| R0 | command completion status |
|---|---|

Flush TTY Port Output Command

This command disposes of any transmitted data for the specified port which remains buffered on the host adapter 18' and the data concentrator 28. The command has one parameter:

| R0 | Port number/Flush TTY Port Output Command |
|---|---|

The port number must be between zero and the maximum number of ports supported by the host adapter 18'. If the port number is invalid or the port is closed, an error code is returned to the host. Otherwise a successful completion status is returned:

| R0 | command completion status |
|---|---|

Flush TTY Port Input and Output Command

This command disposes of any received and transmitted data for the specified port which remains buffered on the host adapter 18' and the data concentrator 28. The command has one parameter:

| R0 | Port Number/Flush TTY port input and output command |
|---|---|

The port number must between zero and the maximum number of ports supported by the host adapter 18'. If the port number is invalid or the port is closed, an error code is returned to the host. Otherwise a successful completion status is returned:

| R0 | command completion status |
|---|---|

Wait for TTY Port Output to Drain Command

This command notifies the host CPU 10 when the specified TTY port output buffer is empty on the host adapter 18' and the data concentrator 28. The command has two parameters:

| R0 | Port number/Wait for TTY port output to drain command |
|---|---|
| R1, R2 | host command reference |

This command completes asynchronously, since it depends on an external event, namely the acceptance of transmitted data by the attached serial device. An immediate command acceptance status is posted to the host CPU 10 when the command is issued. The port number must be between zero and the maximum number of ports supported by the host adapter 18'. If the port number is invalid or the port is cleared, an error code is returned to the host. Otherwise an event pending completion status is returned:

| R0 | Immediate command status |
|---|---|

When the output buffers are emptied, an interrupt is generated to the host CPU 10 and a command completion status is passed to the host CPU 10:

| R0 | command completion status |
|---|---|
| R1 | port number |
| R2, R3 | host command reference |

Wait For TTY Port Modem Status Change Command

This command notifies the host CPU 10 when the specified TTY port detects a modem status change. The command has two parameters:

| R0 | Port number/Wait for TTY port status to change |
|---|---|
| R1, R2 | Host command reference |

This command completes asynchronously, since it depends on an external event, namely the acceptance of transmitted data by the attached serial device. An immediate command acceptance status is posted to the host when the command is issued. The port number must be between zero and the maximum number of ports supported by the host adapter 18'. If the port number is invalid or the port is closed, an error code is returned to the host. Otherwise an event pending completion status is returned:

| R0 | Immediate command status |
|---|---|

When a modem status change is detected an interrupt is generated to the host CPU 10. A command completion status is passed to the host:

| R0 | command completion status |
|---|---|
| R1 | modem status |
| R2, R3 | host command reference |

Cancel TTY Port Wait Command

This command cancels an asynchronous completion command, such as the "Wait for Output to Drain" command. The command has one parameter:

| R0 | Port Number/Cancel TTY port wait command |
|---|---|

The port number must be between zero and the maximum number of ports supported by the host adapter 18'. If the port number is invalid or the port is closed, an error code is returned to the host CPU 10. Otherwise a successful completion status is returned:

| R0 | command completion status |
|---|---|

Get TTY Port Status Command

This command returns the current status of the specified port. The command has one parameter:

| R0 | Port number/Get TTY port status command |
|---|---|

The port number must be between zero and the maximum number of ports supported by the host adapter 18'. If the port number is invalid or the port is closed, an error code is returned to the host CPU 10. Otherwise a successful completion status is returned:

| R0 | command completion status |
|---|---|
| R1 | modem/line status |
| R2, R3 | flow status |

Direct High-Speed Channel Commands

The following commands support use of a high-speed channel as a direct link between host adapters such as 18' in separate systems. There are no changeable port characteristics associated with the high-speed channel. The link is a full-duplex 14-bit data pathway and provides throughput up to 300 kbytes per second.

Open Direct High-Speed Channel Command

This command changes the state of a specified channel from closed to open. The command has two parameters:

| R0 | Channel number/Open channel command |
|---|---|
| R1, R2 | Host reference identifier |

The channel number must be between zero and the maximum number of ports supported by the host adapter 18'. The maximum value is not necessarily fixed, but may be obtained via the "Get Version Information" command described above. If the channel number is invalid or a port is already opened to a data concentrator on the specified channel, an error code is returned to the host. Otherwise, a successful completion status is returned:

| R0 | command completion status |
|---|---|

The host reference identifier is used in subsequent communications with the host device driver. In operation, this is intended to be a pointer to a data structure maintained by the host CPU 10 which is related to the specified channel. Its value and usage by the host CPU 10 are transparent to the host adapter 18'.

Close Direct High-Speed Channel Command

This command changes the state of a specified channel from open to close. The command has one parameter:

| R0 | Channel number/Close channel command |
|---|---|

The channel number must be between zero and the maximum number of ports supported by the host adapter 18'. The maximum value is not necessarily fixed, but may be obtained via the "Get Version Information" command described above. If the channel number is invalid or a port is already opened to the data concentrator 28 on the specified channel, an error code is returned to the host. Otherwise, a successful completion status is returned:

| R0 | command completion status |
|---|---|

Miscellaneous Commands

Shutdown All Ports and Channels Command

This command is equivalent to issuing close commands on all open TTY ports and direct high-speed channels. The command has one parameter:

| R0 | Shutdown all ports and channels command |
|---|---|

Once all ports are closed, a completion status is returned:

| R0 | command completion status |
|---|---|

Execute Diagnostic Routine Command

This command provides an interface to the host adapter 18' firmware diagnostic routines. Some of these diagnostic routines have side effects which limit their application once the host adapter 18' is initialized and in use by the driver. The command has at least two parameters:

| R0 | Diagnostic routine/execute diagnostic routine command |
|---|---|
| 0 | ROM checksum test |
| 1 | RAM read/write verify test |
| 2 | Timer interrupt test |
| 3 | Host interface mailbox test |
| 4 | Bus master block transfer test |
| 5 | High-speed channel internal loopback test |
| 6 | High-speed channel external loopback test |

R1, R2, R3 Test parameters described below: The "RAM Read/Write Verity Test", the "Timer Interrupt Test" and the "Bus Master Block Transfer Test" leave the host adapter 18' in a reset state. Any configuration information and buffered port data may be lost. The internal and external high-speed channel loopback tests leave the specified channel in a reset state. Any configuration and buffered port data may be lost. Additionally, the attached data concentrator 28 may be reset.

The command returns the result of the test routine:

| R0 | command completion status |
|---|---|
| R1,R2,R3 | diagnostic routine completion status |

The "ROM Checksum Test" takes no additional parameters and returns the pass/fail status in R1:

| R0 | command completion status |
|---|---|
| R1 | Pass/Fail |
| | zero—pass |
| | non-zero—fail |

The "RAM Read/Write Verify Test" takes one additional parameter:

| R1 | Number of test repetitions |
|---|---|

Since the entire contents of the RAM 42 are modified by this command the host adapter 18' and firmware are left in a reset state on completion. Command and test completion status are returned as follows:

| R0 | command completion status |
|---|---|
| R1 | Pass/Fail |
| | zero—pass |
| | non-zero—fail |

The "Host Interface Mailbox Test" reads the test parameters from the mailbox registers and uses them as described below to determine the values to be written back to the host CPU 10. Up to three parameters may be given:

| R0 | Test value 1 |
|---|---|
| R1 | Test value 2 |
| R2 | Test value 3 |

The host adapter 18' determines which registers have been written by the host CPU 10 and writes back the test value(s), with all bits complemented, to the same register(s). The test can be used to verify the mailbox data register and the mailbox status register integrity. Of course, at least the mailbox register R0 must be functioning in order for any command processing to take place. The host CPU 10 must verify expected register return values. Command and test completion status are returned as follows:

| R0 | command completion status |
|---|---|
| R1 | Test value 1 complemented |
| R2 | Test value 2 complemented |
| R3 | Test value 3 complemented |

The "Bus Master Block Transfer Test" performs a simple data movement test to verify correct operation of the bus master control logic 56. The command takes two parameters:

| R1, R2 | Physical RAM address of host buffer |
|---|---|
| R3 | One to sixteen kbyte length of host buffer |

The host adapter 18' transfers the specified buffer from host RAM into the RAM 42 and computes a 16-bit checksum. The contents of the buffer are complemented and the buffer is transferred back to the host RAM. Since the contents of the RAM 42 are modified by this command the host adapter 18' is left in a reset state on completion. Command and test completion status are returned as follows:

| R0 | command completion status |
|---|---|
| R1 | pattern checksum buffer |

The "High-Speed Channel Internal Loopback Test" places the data concentrator 28 high-speed channel into software loopback mode. To enter and exit this mode, the data concentrator 28 must be reset, losing current configuration and buffered device data. The command takes two parameters:

| R1 | High-speed channel to test |
|---|---|
| R2 | Number of test repetitions |

Command and test completion status are returned as follows:

| R0 | command completion status |
|---|---|
| R1 | number of loopback errors |

The "High-Speed Channel External Loopback Test" places the host high-speed channel into loopback mode. An external loopback connector must be attached to the adapter channel under test before issuing this command. The command takes two parameters:

| R1 | High-speed channel to test |
|---|---|
| R2 | Number of test repetitions |

If a loopback device is not attached, this test will fail and the data concentrator 28 and serial attached devices may receive unintended data. Command and test completion status are returned as follows:

| R0 | command completion status |
|---|---|
| R1 | number of loopback errors |

Peek Host Adapter RAM 42 Command

The Peek Host Adapter RAM (Debug/Patch) Command facilitates debugging and patching of firmware in the host adapter 18'. This command allows the host device driver to examine arbitrary locations in the RAM 42 address space. The command has two parameters:

| R0 | Peek host adapter RAM command |
|---|---|
| R1, R2 | Physical RAM address |

The work (16-bit) value at the specified location is returned to the host CPU 10:

| R0 | command completion status |
|---|---|
| R1 | data value |

Poke Host Adapter RAM 42 Command

The Poke Host Adapter RAM 42 Command also facilitates debugging and patching of firmware in the host adapter 18', and allows the host device driver to write to arbitrary locations in the RAM 42 address space. The command has three parameters:

| | |
|---|---|
| R0 | Poke host adapter RAM 42 command |
| R1, R2 | Physical RAM 42 address |
| R3 | data value |

The specified value is set immediately and a successful completion status is returned to the host CPU 10:

| | |
|---|---|
| R0 | command completion status |
| R1 | previous contents of specified location |

This command is specified in such a way as to allow implementation of semaphores between the host adapter 18' and the host device driver. This feature may be useful for debugging.

Load New Executable Image Command

This command allows for the loading of a new executable image into the RAM 42. Use of this command effectively stops operation of the current control program in the RAM 42. The new control program is downloaded, overwriting the previous program. The lower 1024-bytes of the RAM 42 are reserved for use during the download operation and may not be overwritten by the download image.

The download image must begin with a special load control header, which includes such information as the destination address of the load image. The command has three parameters:

| | |
|---|---|
| R0 | Replace host adapter 18' control program command |
| R1, R2 | Physical address of load image in host RAM |
| R3 | Length of load image in bytes |

The interrupt processing routine for the host adapter CPU 40 reads the mailbox registers. On determination that the requested command is to load a new executable image, the host adapter CPU 40 aborts any bus master transfer in progress and transfers the special load control header into a reserved location in the lower 1204-bytes of the RAM 42. The remainder of the load image is then transferred to the load address specified in the header. The interrupt vectors for the UART 46 is initialized to point to "no-operation" (no-op) interrupt service routines in the ROM 44. The interrupt service routine for the host service request interrupt is set up to point to a service routine in the ROM 44. The segment registers and stack pointer are then set to the values specified in the control header. Prior to passing control to the entry point specified in the control header, a load command completion status is written to the mailbox register R0 and an interrupt is issued to the host CPU 10 by writing to mail command register:

| | |
|---|---|
| R0 | command completion status |

DEVICE I/O DATA TRANSFER PROTOCOL

Serial device input and output data is transferred between the host CPU 10 and the host adapter 18' by the bus master control logic 56 as directed by the host adapter CPU 40. The host adapter 18' requires reserved, non-swapable data transfer buffers and control structures in the address space of the host CPU 10. These data areas are provided and used cooperatively by the host device driver. If the host adapter 18' is a 16-bit ISA adapter, it can only drive the lower 24 address lines for bus master transfers when installed in an EISA system. Therefore, the shared data areas must reside within the lower 16-megabytes of host RAM address space.

The primary function of an intelligent serial controller is to reduce the number of interrupts to the host CPU 10 due to character input and output. The data transfer protocol described herein allows the host adapter 18' to interrupt the host CPU 10 only as often as required to provide acceptable user key input response. For higher-speed continuous data stream connections the data transfer protocol results in receipt or transmission of many characters per interrupt to the host CPU 10.

Another benefit of the data transfer protocol of the presently disclosed embodiment of the invention is to limit data copying while at the same time isolating the host adapter 18' from knowledge of operating system internal data structures associated with serial devices. In the case of UNIX device drivers, for example, the host adapter 18' may not directly manipulate c-list data structures. For compatibility with multiple versions of the operating system and multiprocessor capabilities, such control is reserved for the device driver executed by the host CPU 10, and is in fact provided by function calls provided by the operating system.

The data transfer protocol of the presently disclosed embodiment of the invention is simple and efficient. The protocol uses four linear list data structures as shall be hereinafter described. Indirect manipulation of complex data structures such as per device circular buffers in the host address space might require many discrete transfer operations by the bus master controller 56. The host device driver would still have to copy the data into or out of the per device buffers from or to the operating system internal data structures.

The locations, sizes, and other information regarding the shared data structures is passed from the host device driver to the host adapter 18'. The following data structure must be initialized by the driver and passed to the host adapter 18' as a parameter to the "Initialize Transfer Data Structures" command:

| | |
|---|---|
| D_INTRPS | zero to twenty interrupts per second |
| D_IOSIZE | 512 to 32768 bytes |
| D_IOBUF | physical address |
| D_CONTENTS | physical address |
| D_RECVSPACE | physical address |
| D_XMITSPACE | physical address |
| D_OUTBAND | physical address |
| D_PORTCOUNT | one to n ports |

The host device driver can use the first two parameters to control I/O latency and memory usage. The number of interrupts per second (D_INTRPS) determines how frequently the host adapter 18' will interrupt the host CPU 10 to transfer device I/O data. The I/O buffer size (D_IOSIZE) determines how much data may be transferred for each interrupt. In general, the host adapter 18' should interrupt the host CPU 10 as infrequently as keystroke response permits and with as much data as possible. The numbers may be determined by experimentation, but an interrupt frequency of ten times per second is probably sufficient to provide good response. An I/O buffer size equal to the aggregate combined device baud rate divided by the data character size and the interrupt frequency should also be sufficient. For example, in one embodiment of the present invention having an eight-port system with two 38.4 kbaud devices, four 9600 baud devices and two 2400 baud devices, could use a 1200 byte I/O buffer at ten interrupts per second, as determined by the following computation:

$(2 \times 38400) + (4 \times 9600) + (2 \times 2400) =$ 120000 combined baud rate 120000 bits per sec/10 bits per character =

12000 characters per second 12000 characters per second/10 interrupts per second =

1200 characters per interrupt

The addresses of the data structures must be specified as physical RAM addresses. Additionally, the host device driver must assure that the area allocated to the data structures is locked-down, i.e. not swapable. The size of the I/O buffer is specified as described above. The size of the remaining data structures is determined by the number of ports which the host device driver supports on the host adapter 18'. This number may be less than the maximum number of ports supported by the host adapter 18'.

The host adaptor 18' may be adaptive in determining how often to interrupt the host CPU 10. If more data is arriving during the specified interrupt period than can be contained in the transfer buffer, then the host adapter 18' may increase the frequency of interrupts up to a maximum of twenty per second. If the number of interrupts per second is specified to be zero, the host adapter 18' has been configured to operate without interrupts to the host CPU 10 and a polled mode of operation is selected. In this mode, the host CPU 10 has control of the frequency of data transfers, as shall be hereinafter described.

Since both the host adapter 18' and the host CPU 10 may access and modify the shared data structures, their use must be arbitrated. At any time, the data structures are said to be "owned" either by the host adapter 18' or the host CPU 10. The host CPU 10 owns the data structures solely until it issues the command to initialize the data structures. Once this command has been executed, the model for sequencing access to the data structures depends on whether interrupt driven or polled data transfer operating mode has been selected.

For interrupt driven mode, the host adapter 18' may be thought to own the data structures, intermittently granting their control to the host CPU 10 and expecting the host CPU 10 to yield them back in a timely fashion. When the host adapter 18' has control of the data structures, the host CPU 10 may not modify their contents. Though the host CPU 10 can read at any time the data structure contents without harm to the transferred data, it may not interpret their contents to be coherent except when the host adapter 18' has granted control to the host CPU 10.

For polled mode, the host CPU 10 may be thought to own the data structures, intermittently granting their control to the host adapter 18' and expecting the host adapter 18' to yield them back in a timely fashion. When the host CPU 10 has control of the data structures, the host adapter 18' must not modify their contents. Though the host adapter 18' can read at any time the data structure contents without harm to the transferred data, it may not interpret their contents to be coherent except when the host CPU 10 has granted control to the host adapter 18'.

The data I/O buffer is the main structure for transferring data between the host adapter 18' and the host CPU 10. It is organized merely as an array of bytes of data to or from serial devices. Only one copy of the I/O buffer exists, that is the one in the address space of the host CPU 10. Two copies of the other three data structures exist, one in the host RAM and one in the RAM 42. The data I/O buffer is filled by the host device driver with output data from the host computer to the serial devices, and filled by the host adapter 18' for input data from the serial devices.

The data I/O buffer is an undistinguished array of bytes to or from a number of devices. The contents list allows the host CPU 10 or the host adapter 18' to determine for which device each byte of data in the buffer is intended. The contents list is an array of device reference handle and count entries, each entry having the following form:

| | |
|---|---|
| CN_TTYREF | device reference handle |
| CN_COUNT | byte count of device data |

The end of the contents list is signified by a null value device reference handle. The maximum length of the contents list is set by the port count parameter D_PORTCOUNT of the "Initialize Transfer Data Structure" command.

Two other data structures allow the host CPU 10 ultimately to control input flow and the host adapter 18' ultimately to control output flow. The host CPU 10 maintains a list of device reference handles and counters which represent the available input buffer space in the host for each device. The beginning of this input buffer space list is indicated by the physical address sent by the host by the parameter D_RECVSPACE. The host adapter 18' respects these limits and transfers no more than the specified number of bytes for each device to the host CPU 10 in the data I/O buffer. Similarly, the host adapter 18' maintains a list of device reference handles and counters which represent the available output buffer space in the host adapter 18' for each device. The beginning of this output buffer space list is indicated by the physical address by the parameter D_XMITSPACE. The host CPU 10 respects these limits and transfers no more than the specified number of bytes for each device to the host adapter 18' in the data I/O buffer.

The final data structure contains per port out-of-band status information such as break indications and gratuitous modem status change indications. This data structure begins at the physical address D_OUTBAND. Like the transfer buffer contents list, this data structure is an array of bytes that indicates which, if any, ports have an out-of-band status change or indication. Each entry is defined as follows:

| OB_TTYREF | TTY reference handle |
|---|---|
| OB_TYPE | out-of-band status type |
| OB_STATUS | status value, as required |

The end of this list is signified by a null value device reference handle. The maximum length of this list is set by the port count parameter D_PORTCOUNT of the "Initialize Transfer Data Structure" command.

The following status types and status values are defined:

| OBT_BREAK | break character received (no associated status value) |
|---|---|
| OBT_MODEM | modem status change (bit-mapped modem status value) |
| OB_STATUS | status value, as required |

Description of the Data Concentrator 28

The data concentrator 28 of FIG. 2 provides a facility for communications with up to eight asynchronous devices via the single high-speed, full duplex data link 30. The communications facilities provided by the data concentrator 28 include remote device I/O, flow control, communications parameter configuration, and operational mode configuration. The maximum device rate for any individual device port in the presently disclosed embodiment of the invention is 38.4 kbits per second. The high-speed data link 30 between the data concentrator 28 and the host adapter 18' in FIG. 2 operates at approximately 600 kbits per second in each direction.

Turning now to FIG. 4, a block diagram showing the major functional components of one embodiment of the data concentrator 28 in accordance with the present invention is provided. The data concentrator 28 includes an RS-422 line driver 70 for interfacing with a corresponding one of the RS-422 line drivers 60 provided at the fanout device 64 of the host adapter 18'. The transmission of the data between the data concentrator 28 and the host adapter 18' is accomplished using the RS-422 differential current signalling conventions implemented by the line drivers 60 and 70. As a result, the data concentrator 28 may be located as far as 500 feet from the host adapter 18'. The output section of the data concentrator 28 is provided by eight RS-232 line drivers, designated as 80 in FIG. 4, which are similar to the RS-232 line drivers 58 in the host adapter 18'. The RS-232 line drivers 80 are connected to eight RJ-45 terminal connectors 82a-82h which are located on a connector 81, wherein the RJ-45 terminal connectors 82a-82h are similar to the RJ-45 jacks 66a-66h provided in the fanout device 64. RS-232 compatible devices may thus be coupled either directly to the RJ-45 jacks 66a-66h of the host adapter fanout unit 64, or to the RJ-45 modular jacks 82a-82h of the data concentrator 28.

In the presently disclosed embodiment, operation of the data concentrator 28 is controlled by a microcontroller 74 which may be a commercially available device, such as the HPC46004 high-performance 20-MHz, 16-bit controller, manufactured by National Semiconductor. It is contemplated that a faster (e.g. 30-MHz) microcontroller device may be employed if higher performance is required. The microcontroller 74 contains 512 bytes of internal RAM (not shown); in addition, the data concentrator 28 includes a 16k × 16 EPROM 76 for storing start-up routines, diagnostic routines, and control program code to be executed by the microcontroller 74. The data concentrator 28 further includes an octal UART 78, which is preferably of the same type as the octal UART 46 in the host adapter 18', and an HSRT 72 which is similar to and capable of communicating with any of the corresponding HSRT's 48–54 in the host adapter 18'. Finally, the data concentrator 28 includes a memory controller and other support logic generally shown as support logic 84.

The memory map in the data concentrator 28 consists of the 512 byte RAM internal to the microcontroller 74, the EPROM 76, and memory-mapped I/O. The physical addresses of all the data concentrator 28 hardware is determined by the implementation of conventional memory decoding logic (not shown). The physical addresses are referenced by the data concentrator 28 as public symbols that are defined to the microcontroller 74 development system linker. The symbols and physical addresses for all memory-mapped I/O are defined in a single source code file. The memory map is set forth in Table 12:

TABLE 12

| DATA CONCENTRATOR 28 MEMORY MAP | | |
|---|---|---|
| Memory Range | Type | Function |
| FFFFh-8000h | Read only | ROM 76 firmware |
| 7FFFh-7000h | Read/Write | Octal UART 78 |
| 6FFFh-6000h | Read only | Octal UART 78 interrupt |
| 5000h | Read/Write | HSRT 72 |
| 4000h | Read only | HSRT 72 status |
| 3000h | Write only | Data terminal ready register |

The first ninety-six words (192 bytes) of RAM in the microcontroller 74, referred to as "base" memory, are addressable in an efficient short address form. Variables and data which must be frequently accessed by the data concentrator 28 are allocated in this base page memory. Base page addressing is an advantage only when using direct addressing modes. If base page memory is accessed indirectly, the access time and instruction fetch time are identical to non-basepage accesses. The 512 bytes of internal RAM in the microcontroller 74 are used for eight device output buffers, a host output buffer, a command response buffer, buffer counts and pointers, state tables, temporary variables, and a stack. The data buffers exist in a ring buffer configuration with a head pointer, a tail pointer, and a count, which are all allocated in base page RAM. Devices of various data communication rates may be attached to the data concentrator 28. Buffering and flow control are provided in the data concentrator 28 to reduce the host adapter 18' processing requirements. Output buffers are defined as discrete entities to allow the development system linker more flexibility in allocating the small amount of system RAM. Thus some output buffers may exist in base page RAM while others do not. Because device output buffers are always accessed indirectly, the RAM type chosen for the buffers does not affect the execution efficiency of the data concentrator 28.

The HSRT's 48, 50, 52, and 54 in the host adapter 18' and the HSRT 72 in the data concentrator 28, shown in FIG. 4, form the serial communications link between the host adapter 18' and the data concentrator 28. Each HSRT comprises a double buffered receiver section and a receiver buffer controller state machine, a double buffered transmitter section and a transmitter buffer controller state machine, a receiver state machine (FIG. 6), a transmitter state machine (FIG. 8) and a status register (not shown). The HSRT's 48, 50, 52, 54 and 72 are designed for a polled environment and have no interrupt capability. Referring to FIG. 2, recall that up to four separate data concentrators, each essentially identical to the data concentrator 28, can be connected to the S0-S3 ports of the host adapter 18'. Therefore, each of the HSRT's 48, 50, 52 and 54 could be connected to a separate HSRT, similar to the HSRT 72, in a data concentrator similar to the data concentrator 28. The HSRT located on a data concentrator is similar to the HSRT's 48, 50, 52 and 54 on the host adapter 18', except that the HSRT's 48, 50, 52 and 54 can initiate a reset sequence which commands the HSRT on the data concentrator 28 to enter a RESET state, whereas the HSRT 72 on the data concentrator 28 may not command the HSRT's 48, 50, 52 and 54 into a RESET state.

Since all HSRT's are similar, it would be instructive to describe a typical transmit and receive cycle between the HSRT 48 and the HSRT 72 as indicative of all communication between the host adapter 18' and the data concentrator 28. The hardware implementation of the RS-422 line drivers 60 and 70 will be momentarily ignored such that there will only be four connection lines between the HSRT 48 and the HSRT 72: a receive data line called RXDATA, a receive clock line called RXCLK, a transmit data line called TXDATA, and a transmit clock called TXCLK. Note that the HSRT 48 signals RXDATA, RXCLK, TXDATA and TXCLK are connected to the HSRT 72 signals TXDATA, TXCLK, RXDATA and RXCLK, respectively, to form a full duplex communication link.

The HSRT 48 transmitter state machine indicates that data is ready to be transmitted by setting the signal TXDATA of the HSRT 48 low. The HSRT transmitter state machine then polls its TXCLK signal to determine when an acknowledge signal is sent. The HSRT 72 receiver state machine, meanwhile, polls its RXDATA signal (connected through the HSRT 48 TXDATA signal) to see when it goes low, indicating that data is ready to be sent. When the HSRT 72 receiver state machine (FIG. 6) detects its RXDATA signal low and is ready to receive data, it outputs seventeen successive clock pulses on the signal RXCLK of the HSRT 72. The first clock pulse is the acknowledge signal which signals the HSRT 48 to supply valid data on the HSRT 48 TXDATA line. The remaining sixteen clock pulses from the HSRT 72 RXCLK signal to the HSRT 48 TXCLK signal cause valid data to be transferred from the HSRT 48 TXDATA signal to the HSRT 72 RXDATA line. This data is transmitted from a transmit shift register 352 (FIG. 9) in the HSRT 48 and is latched into a receiver shift register 250 (FIG. 7) located in the HSRT 72. In a similar manner, the HSRT 72 transmitter state machine (FIG. 8) indicates that it is ready to send data to the host adapter 18' by setting its TXDATA signal low. It then polls its TXCLK signal for an acknowledge signal. The HSRT 48 receiver state machine polls its RXDATA signal until it goes low indicating data is ready to be sent. The HSRT 48 receiver state machine then transmits seventeen successive clock cycles on its RXCLK signal and receives data on its RXDATA signal in the same manner as described above. Note that the receiving HSRT always provides the clock pulses to the transmitting HSRT in order to clock in valid data. In this manner, the interface between the HSRT 72 and one of the HSRT's 48-54 provides for an implicit level of flow control between the host adapter 18' and the data concentrator 28.

The double buffered transmitter section (FIGS. 9 and 9A) on each HSRT consists of a sixteen bit transmitter buffer 350, a sixteen bit transmitter shift register 352 and a transmitter buffer controller state machine (FIG. 9A) to control the operation of the double buffer. Data is written to the transmitter buffer 350 by the local processor. When the transmitter shift register 352 is empty, the transmitter buffer 350 is checked to see if it has data. When the transmitter buffer 350 is full of valid data, this data is latched into the transmitter shift register 352 to be transmitted as described above. The transmitter buffer 350 is then cleared to receive more data to be transmitted. The data in the transmitter shift register 352 is first shifted left by two bits and appended with a parity bit and a stop bit. Odd parity is utilized and the stop bit is always zero.

The double buffered receiver section (FIGS. 7 and 7A) consists of a sixteen bit receiver shift register 250, a sixteen bit receiver buffer 252 and a receiver buffer controller state machine (FIG. 7A) to control the operation of the double receiver buffer. The receiver buffer 252 is checked for when it becomes empty. Data received by the receiver shift register 252 (from a remote HSRT) is shifted right two bits and then latched into the lower fourteen bits of the receiver buffer 252. If a parity error is detected, however, the new data is not latched into the receiver buffer 252 and a PARITY ERROR FLAG is set. The PARITY ERROR FLAG is used as an indication of the integrity of the line between the host adapter 18' and the data concentrator 28. Bit fifteen of the receiver buffer 252 is referred to as the RXFULL flag. This flag is set whenever new data is being latched into the receiver shift register 250 and is cleared when data is read from this register. Bit fourteen of the receiver buffer 252 is referred to as the TXFULL flag. The TXFULL flag is set whenever new data is being latched into the transmitter shift register 352 and is cleared when data is read from this register.

The HSRT status register is a three bit read-only register. Bit zero is the RXFULL flag, bit one is the TXFULL flag and bit two is the PARITY ERROR FLAG, and these are the same flags as described above.

The receiver and transmitter state machines will now be described along with the RESET state which commands the data concentrator 28 to enter a reset sequence. An oscillator circuit (not shown) residing on the host adapter 18' provides many of the clock signals used by the components on the host adapter 18' such as the host adapter CPU 40, the octal UART 46 and the ASIC. One clock signal, preferably operating at a frequency of approximately 9.83 MHz, is provided to the ASIC to clock the receiver and transmitter state machines and the receiver and transmitter buffer controller state machines on the host adapter 18'. The clock signal is preferably divided by ten within the ASIC to provide a 983 kHz state machine clock. The 983 kHz state machine clock is preferably divided by two to provide the TXCLK signal for each of the HSRT's 48-54. The octal UART 78 residing on the data concentrator 28 provides a 9.83 MHz clock, which is preferably divided by ten to provide a 983 kHz clock which is used to clock the receiver and transmitter state machines as well as the receiver and transmitter buffer controller state machines on the data concentrator 28. The 983 kHz clock on the data concentrator 28 is divided by two to provide the TXCLK signal for the HSRT 72.

Figure 6:
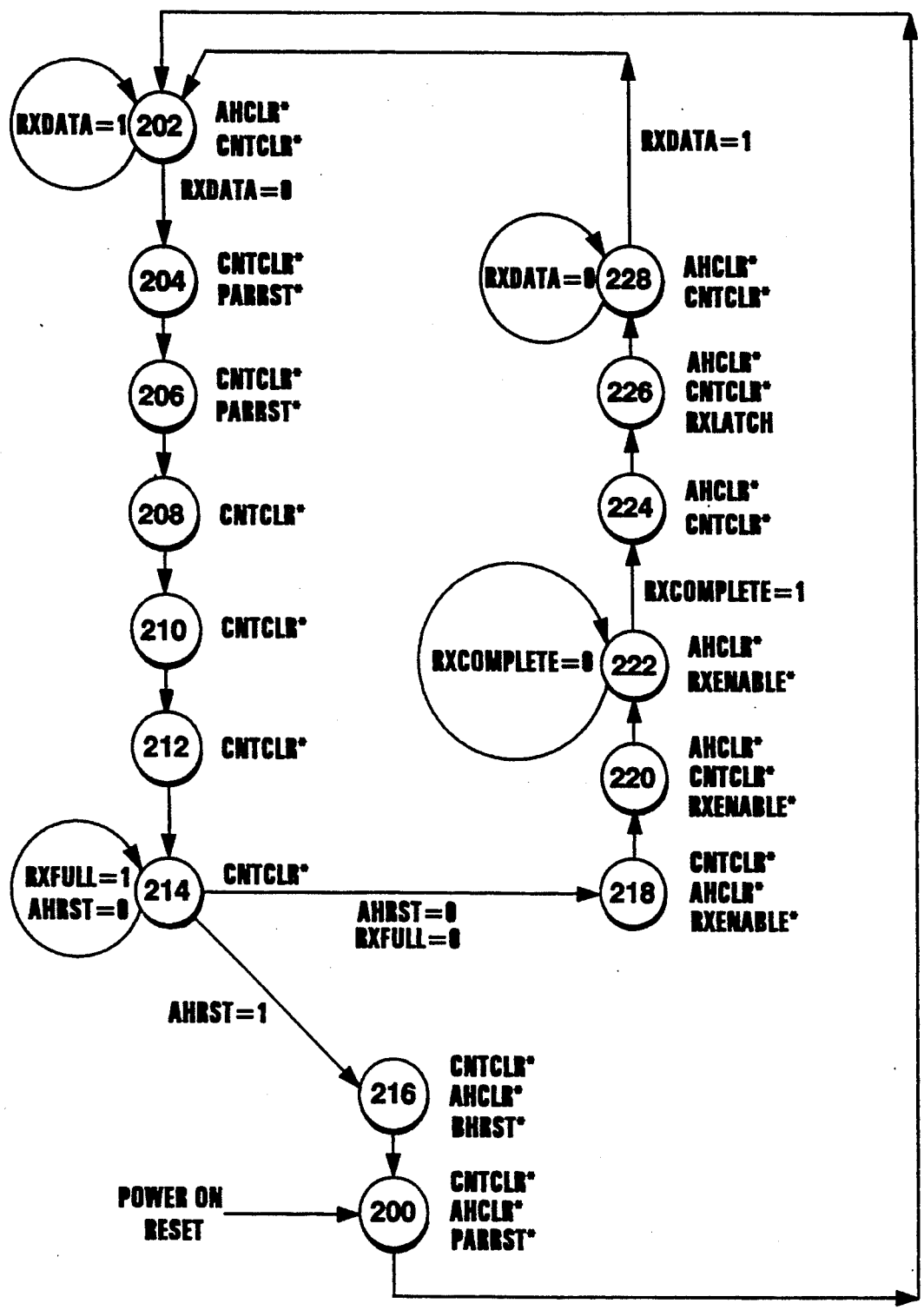
FIG. 6 is a state diagram illustrating the operation of the receiver state machine of an HSRT located on a data concentrator.

Referring now to FIG. 6, when the HSRT 72 is initially powered up, indicated by POWER ON RESET, the receiver state machine of the HSRT 72 enters a state 200. In the state 200, 3 signals CNTCLR*, AHCLR*, and PARRST* are asserted active low. The CNTCLR* signal resets a bit counter, the bit counter being used to count the number of bits received. The AHCLR* signal is a safety mechanism to prevent a signal AHRST (described below) from being asserted accidentally or from noise, and the PARRST* signal resets a parity checking circuit. The receiver state machine the enters a state 202 where it polls the RXDATA signal waiting for it to go low. In the state 202, the AHCLR* and CNTCLR* signals remain asserted low. If the RXDATA signal goes low, this signals the receiver state machine that the HSRT 48 is ready to transmit data to the HSRT 72. When the RXDATA line does go low, the receiver state machine enters a state 204 where the CNTCLR* and PARRST* signals are asserted low. The receiver state machine steps through several delay states 206, 208, 210, 212 and 214, monitoring to see if the HSRT 48 is sending a reset sequence. The reset sequence occurs during this time if the HSRT 48 transmits two rising edges on its TXDATA line before the acknowledge signal is transmitted by the HSRT 72 to the HSRT 48. In the state 206, the PARRST* signal is asserted, and in the states 206–214, the CNTCLR* signal is continually asserted. If the HSRT 72 detects the two rising edges on its RXDATA line, then the signal AHRST is asserted high and the receiver state machine enters a state 216 and the data concentrator 28 enters a sixteen microsecond RESET state.

The AHCLR* signal is not asserted in the states 204–214 to allow for AHRST signal to be asserted. If the AHRST signal is asserted, the state machine enters the state 216 and a signal BHRST* is asserted low to initiate a timer (not shown) to begin the sixteen microsecond reset. The signals AHCLR* and CNTCLR* are also asserted in the state 216. The state machine then re-enters the state 200. The receiver state machines for the HSRT's 48–54 on the host adapter 18' are similar to this state machine, except that the receiver state machine for the HSRT's 48–54 do not enter the state 216 since the data concentrator 28 can not send a reset sequence to the host adapter 18'. This is the primary difference between the receiver state machine for the HSRT 72 on the data concentrator 28 and the receiver state machines for the HSRT's 48–54 on the host adapter 18'.

In the state 214, if a reset sequence was not sent such that the AHRST signal remains low, the receiver state machine polls the RXFULL flag to determine when the receiver shift register 252 is ready to accept data. When the RXFULL flag is cleared indicating that the receiver shift register 252 is empty, and the AHRST signal is low, the receiver state machine enters a state 218. In the state 218, the CNTCLR* signal remains asserted, and the AHCLR* signal is once again asserted to prevent a false reset state. An RXENABLE* signal is asserted low in the state 218 which enables the receiver shift register 252 to receive data. The receiver state machine then steps through a state 220 and into a state 222. The AHCLR*, CNTCLR* and RXENABLE* signals remain asserted in the state 220, which is essentially a timing delay state.

In the state 222, the HSRT 72 asserts the clock signals on the RXCLK line to latch sixteen bits of data into the receiver shift register 252. A signal RXCOMPLETE remains low until all the data is received, which is indicated by the bit counter. The RXCOMPLETE signal is polled in the state 222, and the receiver state machine enters a next state 224 when the RXCOMPLETE signal goes high. The AHCLR* and RXENABLE* signals remain asserted in the state 222, but note that the CNTCLR* signal is not asserted since the bit counter counts the number of bits received while in the state 22 to determine when all the data is received. When the bit counter reaches a certain pre-defined number to indicate the number of bits to be received, the RXCOMPLETE signal is asserted high and the receiver state machine enters the state 224. The CNTCLR* signal is re-asserted in the state 224 to clear the bit counter circuit, and the AHCLR* signal remains asserted low.

The receiver state machine then enters a state 226 in which a signal RXLATCH is asserted high. The RXLATCH signal clocks a parity logging latch (not shown) which indicates whether a parity error has occurred. If a parity error has occurred, a signal RXFULL will not be asserted high (described below), such that the data in the receiver shift register 250 is considered invalid and will not be latched into the receiver buffer 252. The data in the receiver shift register 250 is eventually discarded as new data is shifted into the receiver shift register 250 during the next cycle if a parity error has occurred. If no parity error is detected, then the signal RXFULL will be asserted and the data is eventually latched into the receiver buffer 252.

The AHCLR* and CNTCLR* signals are also asserted in the state 226. The state machine then enters a state 228 wherein the RXDATA signal is polled until it goes high, to prevent a bad data transfer from taking place if the RXDATA signal has not returned to a high state by the time the RXCOMPLETE signal has been generated. The AHCLR* and CNTCLR* signals are asserted in the state 228. When the RXDATA signal goes high, the receive cycle is complete, and the receive state machine re-enters the 202 state to monitor when the RXDATA signal goes low again for a new receive cycle.

Figure 7A:
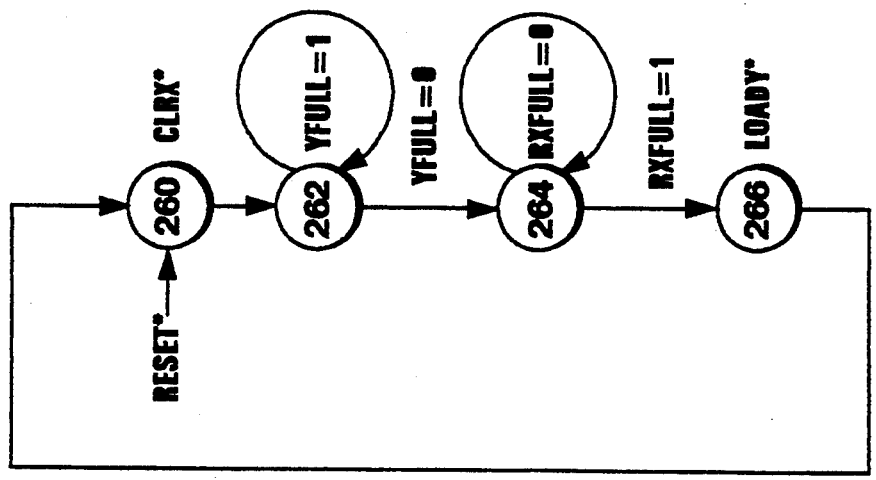
FIG. 7A is a state diagram illustrating the operation of the receiver buffer controller state machine which controls the operation of the double buffered receiver section of FIG. 7.
Figure 7:
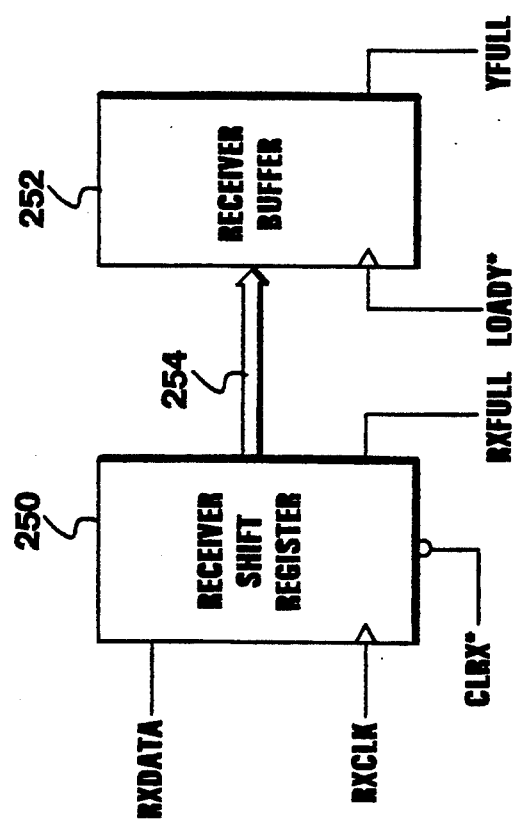
FIG. 7 is a schematic diagram of the double buffered receiver section within each HSRT.

Referring now to FIGS. 7 and 7A, the double buffered receiver section and buffer controller state machine within each of the HSRT's 48–54 and 72 will be described. In FIG. 7, the receiver shift register 250 receives data from the RXDATA signal input. The data is clocked in, one bit at a time, with the RXCLK input. When the receiver shift register 250 is full of valid data, the signal RXFULL is asserted high. If a parity error has occurred, the RXFULL signal will not be asserted high. If the data is valid, the data is transferred to the receive buffer 252 through a data path 254 when a signal LOADY* is asserted low. A signal YFULL goes high when the receiver buffer 252 is full of data. The receiver shift register 250 can be cleared to receive new data by asserting a CLRX* SIGNAL.

The receiver buffer controller state machine that controls the operation of the receiver shift register 250 and receiver buffer 252 is shown in FIG. 7A. Recall that the 983 kHz clock provides the clock which clocks the receiver buffer controller state machine. Upon assertion of the RESET* signal low, the state machine enters a state 260 wherein the CLRX* signal is asserted to clear the receiver shift register 250. The state machine then enters a state 262 wherein the YFULL signal is polled while the receiver buffer 252 is still full of valid data. When the local CPU reads from the receiver buffer 252, the YFULL signal goes low and the state machine enters the state 264. Meanwhile, after the receiver shift register 250 was cleared, it could receive new data. The receiver buffer controller state machine polls the signal RXFULL until it goes high indicating that the receiver shift register 250 is full of valid data. If valid data is received, the state machine enters a state 266 wherein the signal LOADY* is asserted to transfer data from the receiver shift register 250 through the data path 254 into the receiver buffer 252. The state machine then re-enters the state 260 wherein the signal CLRX* is asserted once again to clear the receiver shift register 250 to receive new data. In the state 264, if a parity error is received, the RXFULL signal will not go high and the receiver buffer controller state machine remains in the state 264. The receiver state machine meanwhile enters another receive cycle to attempt to latch in valid data. When valid data is eventually received, the RXFULL signal is asserted and the receiver buffer controller state machine enters the state 266. The double buffered receiver section and state machine thus continually moves valid data away from the receive shift register 250 into the receive buffer 252 so that new data can be received by the receiver section of the local HSRT which helps keep the receiver efficiency high.

Figure 8:
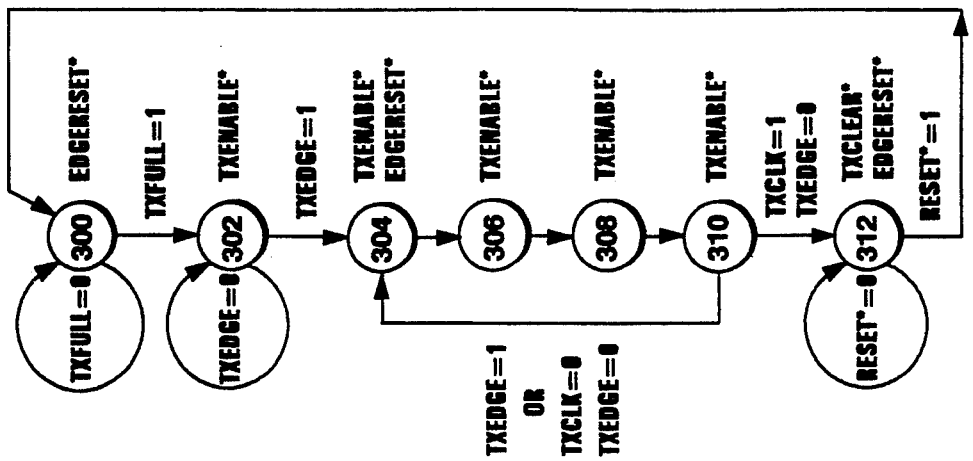
FIG. 8 is a state diagram illustrating the operation of the transmitter state machine of an HSRT located on a host adapter.

Referring now to FIG. 8, the transmitter state machine of the HSRT 48 will now be described. Recall that the 984 kHz clock within the ASIC clocks the transmitter state machine of the HSRT 48. In a first state 300, the transmitter state machine polls the signal TXFULL to determine when the transmitter shift register 352 is full of valid data to be sent. When the transmitter shift register 352 is full of valid data, TXFULL goes high and the transmitter state machine enters a state 302, where it asserts a signal TXENABLE* to enable the transmitter shift register 352 to serially shift data out to the HSRT 72. While in the state 302, the transmitter state machine waits for a rising edge on its TXCLK signal, which is indicated by a signal TXEDGE and is sent by the remote HSRT 72 to indicate that the HSRT 72 is ready to receive data. The signal TXEDGE is asserted high every time a rising edge is received on the TXCLK signal.

When the TXEDGE signal goes high, the transmitter state machine enters a state 304 and the transmitter shift register 352 begins to serially shift data out to the remote HSRT 72 with each rising edge of the TXCLK signal. A signal EDGERESET* is asserted low which resets the TXEDGE signal low. The signal TXENABLE* remains asserted low in the state 304. The state 304 and the next three states 306, 308, and 310 form essentially a delay loop which monitors the TXCLK and TXEDGE signals to determine when the remote HSRT has completed clocking in the transmitted data. Recall that the TXCLK clock frequency is preferably half the frequency of the transmitter state machine clock. The state machine steps through the states 304–310 with each pulse of the clock, asserting the signal TXENABLE* while data is being transmitted. In the state 310, the signals TXCLK and TXEDGE are monitored to determine whether the transmission is complete. In the state 310, if the TXCLK signal is low and TXEDGE is low, or if a rising edge has recently been received such that the TXEDGE signal is high, then data transmission is not complete and the transmitter state machine will loop back into the state 304.

Again, in the state 304, the signal EDGERESET* is asserted to clear the TXEDGE signal so that the next rising edge, if any, on the TXCLK signal can be detected.

Once the data transfer is complete, the receiving HSRT 72 holds the TXCLK signal high for a predetermined period of time to indicate the completion of transmitted data. The complete condition will be detected by the state machine in the state 310 by the TXCLK signal being high (logic 1) and the TXEDGE signal being low (rising edge not detected) and the transmitter state machine will enter a state 312. In the state 312, the EDGERSET* signal is asserted to clear TXEDGE, and a signal TXCLEAR* is asserted low to clear the transmitter shift register 352 (FIG. 9) to prepare it to receive more data for transmission. Also, if the RESET* signal is asserted low when the data transfer is complete, the transmitter state machine will remain in the state 312 until the RESET* signal is de-asserted high. If the RESET* signal is not asserted, or when it is finally de-asserted high, the transmitter state machine re-enters the state 300 and the process repeats.

Figure 9A:
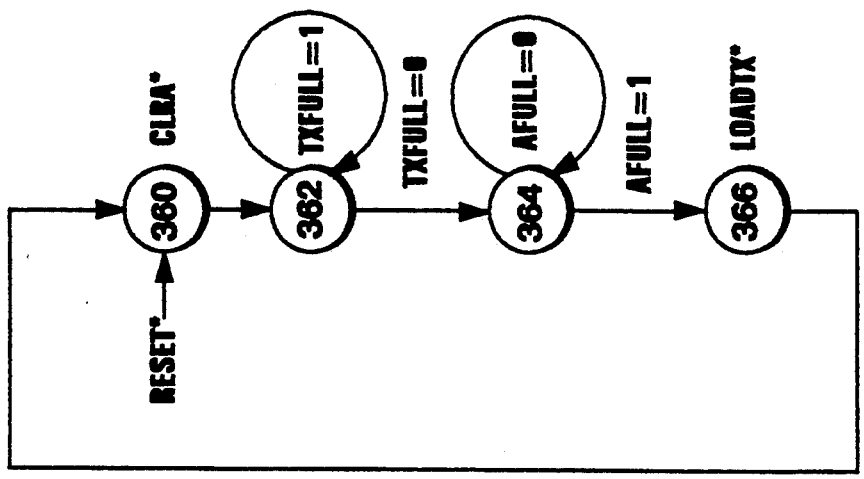
FIG. 9A is a state diagram illustrating the operation of the transmitter buffer controller state machine which controls the operation of the double buffered transmitter section of FIG. 9.
Figure 9:
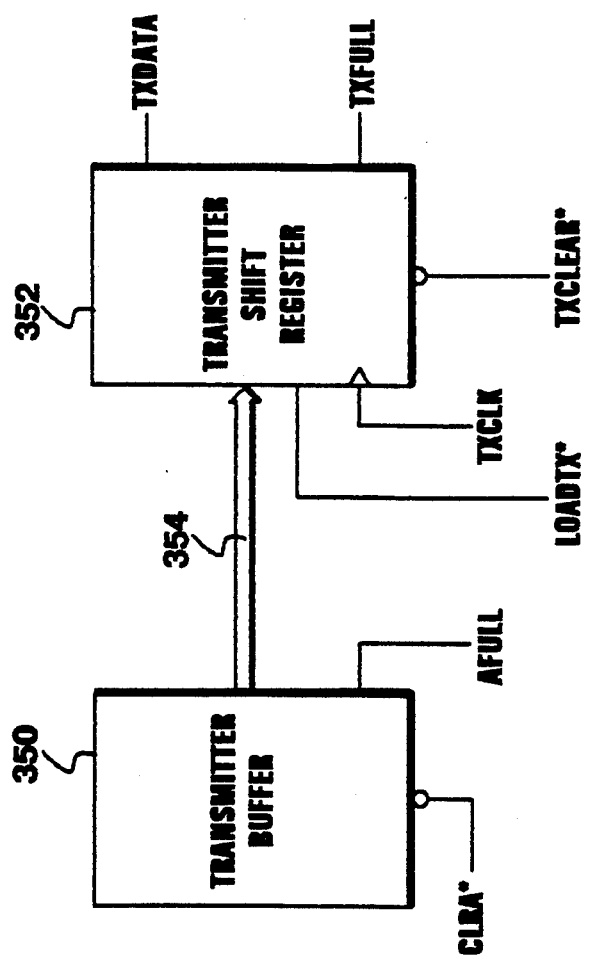
FIG. 9 is a schematic diagram of the double buffered transmitter section within each HSRT.

Referring now to FIGS. 9 and 9A, the double buffered transmitter section will be described. In FIG. 9, the transmitter buffer 350 receives data from the local CPU to be transmitted to the remote HSRT. The signal AFULL is asserted high when the transmitter buffer 350 is full of valid data. The data is transferred to the transmitter shift register 352 through a data path 354 when a signal LOADTX* is asserted low. The transmitter buffer 350 can then be cleared by asserting a signal CLRA* low so that it can be loaded with new data to be transmitted. The signal TXFULL is asserted high when the transmitter shift register 352 is full of data to be transmitted. Data is shifted out on the TXDATA signal, one bit at a time, upon successive clock pulses asserted on the TXCLK signal. When all the data is sent, the TXFULL signal goes low indicating that the transmitter shift register 352 is ready to receive more data from the transmitter buffer 350.

The transmitter buffer controller state machine that controls the operation of the double buffer transmitter section is shown in FIG. 9A. Again, the 983 kHz clock clocks the transmitter buffer controller state machine. When the RESET* signal asserted low, the state machine enters a state 360 wherein the CLRA* signal is asserted low to clear the inner transmitter buffer 350. The state machine then enters a state 362 wherein the TXFULL signal is polled until it goes low indicating that the transmitter shift register 352 is empty and ready to receive more data. When the TXFULL signal goes low, the state machine enters a state 364 wherein the AFULL signal is polled to determine when it goes high. When the AFULL signal is asserted high, the transmitter buffer 350 is full of data received from the local CPU to be transmitted to the remote HSRT. The state machine then enters a state 366 wherein the signal LOADTX* is asserted to transfer data from the transmitter buffer 350 to the transmitter shift register 352 through the data path 354. The transmitter state machine, described previously, controls the transmission of data out of the transmitter shift register 352. The transmitter buffer controller state machine then re-enters the state 360 wherein the CLRA* signal is asserted once again to clear the transmitter buffer 350 to receive more data from the local CPU. Therefore, the double buffered transmitter section continually moves data away from the transmitter buffer 350 into the transmitter shift register 352 so that new data can be transmitted by the local HSRT which helps keep the transmitter efficiency high.

Addressed Packet Protocol

All communication between the host adapter 18' and the data concentrator 28 is through the HSRT 72 using a fourteen-bit addressed packet protocol. The fourteen-bit packet, or frame, provides for multiplexing and demultiplexing information, flow control information, diagnostic and status massaging, device data, and configuration information. In general, the frame consists of a three bit frame-type field, a three bit address field, and an eight bit data field. The frame-type field indicates what type of information is contained in the frame. In most cases, the address field indicates the logical port number (i.e. which of the RJ-45 connectors 82a–82h that the device is connected to) for which the data applies. The exception to this rule are frames which have global meaning to the host adapter 18' or the data concentrator 28. The data field is context dependent, according to the frame-type. Details are described below.

The UART 78 supports eight full-duplex asynchronous channels which provides the communication link between the data concentrator 28 and the asynchronous devices. Each of the eight channels of the UART 78 comprises a transmitter and a receiver that can be programmed for any of the standard baud rates between 110 and 38.4K. Each channel contains 42 bytes of First-In-First-Out (FIFO) buffer space divided into three fourteen-bit buffers using the fourteen-bit addressed packet protocol including an eight-byte transmit FIFO, an eight-byte receive FIFO and an eight-byte status FIFO. Each channel also supports the following: User programmable and automatic flow control modes; four modem control signals—CD, DSR, RTS and CTS; odd, even, no parity or forced parity; 1, 1.5 and 2 stop bits; and five to eight character bits plus optional parity.

As shown in Table 12 above, the UART 78 functions on the microcontroller 74 system bus as a memory mapped device. The UART 78 uses the systems read, write, address, data and interrupt lines. The support logic 84 supplies the chip select and interrupt acknowledge signals for the UART 78. The microcontroller 74 supports four system level interrupts so that the UART 78 can interrupt the microcontroller 74 when necessary. The first level interrupt is nonmaskable and is asserted when an interrupt service to the UART 78 has been unsuccessful. The second level interrupt is asserted by the UART 78 when any of the UART 78's receive data FIFO buffers reaches its preprogrammed threshold. The third level interrupt is asserted by the UART 78 when any of the UART 78's transmit data FIFOs are emptied or the transmitter holding and shift registers are emptied. The fourth level interrupt is asserted by the UART 78 when any of the UART 78's modem control signals change state.

The data concentrator 28 generates output delays on a per channel basis. Output delays are timed by the UART 78. The UART 78 is programmed for a mode of operation which allows for embedded transfer control via sequences in the data stream. When the data concentrator 28 is sent an output delay frame, the microcontroller 74 builds an escape sequence in the appropriate device output buffer. Generation of break signals is accomplished in a similar manner.

The data concentrator 28 is responsible for executing, and in most cases, responding to commands as defined in the addressed packet protocol. In general, the data concentrator 28 will respond to all commands except those which affect the immediate flow state of a device channel. The data concentrator 28 imposes a limit on the frequency of commands that the host adapter 18' and also imposes a limit of one active command per channel, except for a few special cases, such as flow control commands and line status requests. Commands which require acknowledgement are acknowledged via the addressed packet protocol. If the host adapter 18' violates the one active command in progress restriction, the data concentrator 28 issues a command-in-progress frame via the addressed packet protocol. Command responses are placed in the command response buffer when the command is processed. Command responses and other information sharing the command response buffer are sent to host adapter 18' by the host transmit prioritization of the polling loop which will be described below.

The data concentrator 28 may transmit status information to the host adapter 18' via the addressed packet protocol. The status information may be sent either at the request of the host adapter 18' or as a result of a monitored status change. Status change information will be sent to the host adapter 18' when a monitored state changes or a monitored event occurs. The host adapter 18' may select the monitored conditions via the addressed packet protocol.

When the host adapter 18' transmits data intended for an asynchronous device attached to the data concentrator 28, the data concentrator 28 receives the data from the HSRT 72 during its polling routine. The device for which the data is intended is determined at that time, and the data is placed in the appropriate device output buffer. It is the responsibility of the device output flow control mechanism to ensure that the host adapter 18' does not transmit data intended for a device which has no remaining buffer room. Device data is taken from the device output buffers and passed to the device during the transmit interrupt service routine which will be described below.

Data is received from devices during the receive interrupt service routine. When the data is received from the device, a data frame is assembled according to the addressed packet protocol and immediately placed in the host adapter output buffer. The device input flow control mechanism is responsible for preventing the host adapter output buffer from becoming full. The data is passed on to the host adapter 18' by the data concentrator 28 polling routine.

The primary function of the data concentrator 28 main polling loop is to route data between the HSRT 72 and the data buffers, and to initiate execution of command processing routines. The polling routine periodically checks the HSRT 72 data and status registers for valid incoming data. When a data frame is received, the polling routine determines the frame type from the frame-type field in the packet and takes appropriate action. If the data received is intended for a device, it is buffered immediately. All other frame types are processed by the command processing routines. Device data, command responses and flow control information share the HSRT 72. Prioritization of the above data types is managed by the host transmit prioritization mechanism of the polling routine. The transmit priority is fixed in descending order of flow halting, command responses, and device data.

As described previously, to facilitate automatic detection of the data concentrator 28 by the host adapter 18', the data concentrator 28 guarantees the transmission of an ID response packet, consistent with the addressed packet protocol, on a periodic basis. The data concentrator 28 accomplishes this by transmitting a unique frame when the transmitter has been idle for a significant period of time.

Four interrupt types are serviced in the data concentrator 28 firmware in the following fixed priority: Receive data (highest priority), transmit data, modem control signal change, and timer (lowest priority). The UART 78 is programmed to interrupt the microcontroller 74 when various conditions occur. The specific interrupt conditions are dictated by configuration packet protocol frames from the host adapter 18'. For example, if the host adapter 18' configures the data concentrator 28 to report modem control signal changes, the UART's 78 modem change interrupt is enabled.

The receive data interrupt routine is divided into good data and exception data routines. The UART 78 indicates which type of received data interrupt has occurred. In the case of good data, the UART 78 supplies the channel number and a count of the characters in the FIFO of the UART 78. The good data receive service routine reads the characters from the data register of the UART 78, assembles data frames according to the addressed packet protocol specification, and places the data in the host adapter 18' output buffer. The service routine then checks the remaining room in the buffer, and if the buffer is sufficiently full, flow control for all devices is initiated as described below.

In the case of exception data, the type of exception is compared to internal state tables to determine if the host adapter 18' is concerned with this type of exception for the channel which caused the interrupt, or if the data concentrator 28 is to perform some other action based on the exception condition, such as flushing input buffers on break detect. If the state information indicates that the condition should be reported to the host adapter 18', such as modem control signal changes, a frame is constructed according to the addressed packet protocol and placed in the host adapter output buffer. If the exception condition is not to be reported, the exception condition is ignored.

In most operating modes of the data concentrator 28, the UART 78 is programmed to interrupt when the transmitter FIFO becomes empty. The UART 78 will then generate interrupt requests as soon as the last character in the transmit FIFO is written to the transmit shift register. When the interrupt is serviced, the UART 78 supplies the interrupting channel number, and implicitly indicates that it is ready to accept up to eight characters for that channel. The device output buffer for the interrupting channel is checked for data to transmit. If data is available, characters are written to the transmit register until eight characters have been written, or until the device output buffer becomes empty.

If the output buffer is empty at the time the interrupt occurs, internal state tables are examined to see if the host adapter 18' had requested a signal when the output buffer became empty. If a wait for output buffer empty request had been made for the interrupting channel, the command processing routine would have set the interrupt conditions in the UART 78 to request an interrupt on transmitter empty. If the wait for output buffer empty state is active, the occurrence of this interrupt indicates that the last character written to the data register has been serialized and shifted out to the device. When this occurs, a frame is placed in the host adapter output buffer indicating that the output buffer has emptied. The data concentrator 28 then resets the transmit interrupt conditions in the UART 78 to interrupt on transmit FIFO empty, and clears the wait for output buffer empty state.

For modem control signal change interrupts, the UART 78 is set to interrupt on the conditions in which the host adapter 18' is interested, or for which the host adapter 18' has requested flow control. When the interrupt occurs, the cause of the interrupt is compared to status information to determine if flow control action is required, and if necessary, the transmitter is enabled or disabled according to the type of signal change that occurred. If the change is one that the host has expressed interest in, a frame is constructed according to the addressed packet protocol, and placed in the device input/host output buffer.

A timer interrupt has two potential timer sources which may interrupt the microcontroller 74. One of the timer interrupts is enabled immediately after the memory tests, and remains enabled thereafter. The function of this timer is to generate a time base for servicing the microcontrollers 74 watchdog logic. This watchdog timer is merely a fail-safe mechanism in case the microcontroller 74 program crashes. Normally, the watchdog timer will be serviced if the microcontroller 74 is executing properly. Otherwise, if the watchdog timer is not serviced, it triggers a hardware reset of the entire data concentrator 28. The second timer interrupt serves as a time base for a signaling timeout mechanism, and is enabled by a call to the settimer( ) function in the data concentrator 28 firmware. The settimer( ) function accepts a pointer to a semaphore variable and a time interval as arguments. The settimer( ) function sets the second interrupting timer to the specified interval and enables the second timer interrupt. When a timer interrupt occurs, the timer interrupt service routine polls the timer registers to determine the source of the interrupt. If the watchdog service timer interrupt is pending, the watchdog timer is serviced before checking the state of the second timer. If the second timer interrupt is pending, the semaphore is updated, and interrupts for the signal timer are disabled.

Flow Control

Device input flow control, that is, information from the device flowing to the host, is under the control of the host adapter 18' during normal operation of the data concentrator 28. Note also, however, that the host also exercises input flow control by defining the maximum number of bytes to be received from the host adapter 18' from each device in any given transfer of data to the data structure beginning at the address identified by D_RECVSPACE. When the host adapter 18' can not readily accept data from a device, it must initiate flow control via the addressed packet protocol. This flow control may be in-band, out-of-band, or both. Flow control information is then immediately passed on to the device by the data concentrator 28. The data concentrator 28 executes flow control commands from the host adapter 18', but does not acknowledge them as it does other types of commands. Flow control commands from the host adapter 18', therefore, are executed without any acknowledgement whatsoever.

The host adapter 18' has the responsibility of preventing overflow of the host output buffer in the data concentrator 28. To prevent overflow of the buffer, the host adapter 18' must coordinate input polling frequency with input flow control. If the host adapter 18' is not able to poll the receive buffers of the HSRT's 48, 50, 52 or 54 at a rate greater than the aggregate character input rate of all eight devices, it must initiate flow control on a per-channel basis to reduce the input rate to a manageable level. If this requirement is not met, the data concentrator 28 will enter a global flow control state, to be described below, in which it attempts to halt all input flow.

As described previously, 36K bytes of the RAM 42 are reserved for device input and output buffers. Each input buffer and output buffer is implemented in first-in-first-out (FIFO) form for each of the devices 12-16 in the system. The host adapter CPU 40 takes data from the devices 12, 14, and 16, either received from the HSRT's 48-54 or from the octal UART 46, and places the data into a device specific input buffer to be later transferred to the data I/O buffer located o the host. Similarly, the host adapter CPU 40 takes data from the device specific output buffers, determines where in the system the device is located, and sends the data to the device. For example, if the data is intended to go to the device 12, the host adapter CPU 40 assembles an addressed packet and transfers the data to the HSRT 48 to eventually be transferred to the data concentrator 28, and ultimately to the device 12. If the data is for the device 16, the data is transferred to the appropriate UART located in the octal UART 46 to be transferred across the serial link 26 to the device 16.

A standard FIFO implementation, as known to those skilled in the art, includes a count identifying the number of bytes contained in the FIFO buffer. Each time the host adapter CPU 40 inputs data into an input buffer, it updates the count number and compares the number with a predetermined high level number indicating FIFO overflow. If the amount of data in the FIFO is above the predetermined high level, the host adapter CPU 40 sends a flow command to the corresponding device associated with the input FIFO buffer, instructing the device to stop sending data. Eventually, the host adapter CPU 40 and the bus master 56 will take data out of the input FIFO buffer and bus master the data to the host computer data I/O buffer. The host adapter CPU 40 decrements the count of data in the input FIFO buffer and compares the new count with a predetermined low level. If the actual count is at or below the predetermined low count level, the host adapter CPU 40 re-initiates flow from the device by sending the device another flow command, instructing the device to begin sending data again.

As described above, the host adapter 18' initiates flow control on a per-channel basis to keep data flow at a manageable level. If, however, the host adapter 18' is unable to clear the host output buffer in the data concentrator 28, the data concentrator 28 initiates a fail-safe mechanism called global flow control. If the data concentrator 28 enters the global flow control state, it initiates flow control on all channels according to the current flow state of each channel. The data concentrator 28 maintains the current input flow state of each device as it processes flow control commands from the host adapter 18'. In-band flow control for a channel is initiated by the data concentrator 28 if the host adapter 18' has enabled in-band flow control for that channel and that channel is not being controlled by the host adapter 18'. If the host adapter 18' has enabled out-of-band global flow control for a channel, the modem control signal lines for that channel are negated.

When the main polling loop of the data concentrator 28 firmware transmits device data to the host adapter 18', it checks the host output buffer capacity. If global flow control is active and the buffer has emptied sufficiently, the global flow control state is cleared, and the flow state of all devices is restored according to the current flow state of each channel. Since the host adapter 18' may still issue flow control commands to the data concentrator 28 while global input flow is active, the data concentrator 28 maintains the state of flow control "ownership" for devices. If a device is not in the flow-active state when global flow control occurs, the flow control is owned by the global flow mechanism. If the host adapter 18' sends a flow-off frame to a device under global flow control, the host adapter 18' gains ownership of flow control for that device. If the host adapter 18' sends a flow-on frame for a device when global flow control is active, the global flow mechanism regains ownership of flow control.

Device output flow control, that is, data flowing from the host to all of the devices, occurs on a per-channel basis and is managed at two points of data flow. The first is data flowing from the host adapter 18' to the data concentrator 28. This flow control prevents the device output buffers in the data concentrator 28 from overflowing. The second point of data flow which is controlled is data flowing from the data concentrator 28 to the device. This type of flow control prevents the data buffers in the device from overflowing.

Flow between the host adapter 18' and the data concentrator 28 is initiated by the data concentrator 28 when a device output buffer begins to fill. The main polling routine examines the buffer capacity at the point when device data is being put in a device output buffer. If the buffer is full beyond a defined point, a flow control pending state is set for that channel. This flow-pending state is later examined by the host adapter 18' transmit prioritization mechanism of the polling loop, and if the channel is in the flow-pending state, a flow-off control frame is sent to the host adapter 18', and the flow-pending state is changed to flow-active state. But before the flow-active state is entered, the flow-pending state can be cleared by the transmit data interrupt service routine. If the buffer is sufficiently emptied to another predefined point by the transmit service routine during the flow-pending state, the state will be cleared. Otherwise, the flow-active state will be entered.

The flow-active state for a channel is also cleared by the transmit interrupt service routine. When the device output buffer is sufficiently emptied by the transmit service routine, the flow-active state is cleared, and a flow-on frame is put in the command response buffer. The contents of the command response buffer are sent to the host adapter 18' by the host transmit prioritization mechanism of the polling loop.

Device output flow between the data concentrator 28 and the device is regulated by the device. The data concentrator 28 may be configured on a per-channel basis by the host adapter 18' to recognize various forms of flow control. If a channel is configured for in-band flow control, the flow control characters must also be configured. Once configured, in-band flow control is processed by the UART 78, and no processing by the microcontroller 74 is required. A channel may also be configured for out-of-band flow control. The input signals CTS and DSR may be used to enable or disable the transmitter for a device. If both CTS and DSR are configured in this auto-transmitter enable mode, a state change on either modem control signal will result in the state of the transmitter being set according to the most recent signal change.

The Host Adapter 18' and the Data Concentrator 28 Addressed Packet Protocol

As described above, the packet, or frame, may comprise a frame-type field, an address field if appropriate, or a data field if it is a data packet. The packet may also comprise a frame-type field and a command wherein the command instructs the data concentrator 28 to perform some operation or function, if the frame is sent by the host adapter 18' to the data concentrator 28. The data concentrator 28 also sends command responses back to the host adapter 18' through the addressed packet protocol. The complete specification for the addressed packet protocol exists as a C language header file to be used by the host adapter 18' and the data concentrator 28 source modules. The frame-types and a description of each is listed below.

The following frame-types are sent by the host adapter 18' to the data concentrator 28:

| | |
|---|---|
| LHCT_DEVDATA | A device data frame. The data is intended for a device. |
| LHCT_RCOND | Selects the conditions for which the data concentrator 28 is to transmit state change information. |
| LHCT_SBR | Sets baud rate of a device port and enables or disables in-band flow control. |
| LHCT_LPARM | Sets the operating parameters (Data bits, parity, and stop bits) for a device port. |
| LHCT_SETXON | Sets the XON flow control character |
| LHCT_SETXOFF | Sets the XOFF flow control character |
| LHCT_CMD | Selects diagnostic and other operating states. The data field selects the specific state. |
| LHCT_FLS | Performs flow state setting functions, selectable by a subset of the data field. |

The flow state setting function types are:

| | |
|---|---|
| LHC_FLOWX | Sets the device output flow state. (sends XON or XOFF to a device). |
| LHC_SETLINE | Sets modem signal line output states. |
| LHC_TXDELAY | Inserts an output delay in the device output data stream. |
| LHC_TXBREAK | Sends a break signal to a device. |
| LHC_SETAF | Sets auto hardware flow states in the data concentrator 28. |

The following frames are sent by the data concentrator 28 to the host adapter 18':

| | |
|---|---|
| LCHT_DEVDATA | A device data frame. |
| LCHT_STCHG | Reports status change information for a device port. |
| LCHT_PE | Reports a parity error for a device port. |
| LCHT_LS | Reports modem control signal line change. |
| LCHT_DRESP | Response to a mode setting command. |
| LCHT_FC | Flow control frame. Sets state of host adapter 18' to data concentrator 28 flow. |
| LCHT_RES | Response to reset (self test diagnostic result), or firmware version request. |

When a valid frame is received by the data concentrator 28, an index is created from a combination of the frame-type and the address fields of the addressed packet protocol. This index accesses an entry in a receive host data jump table of the firmware. The firmware routines accessed via the jump table perform the following actions according to frame-type:

| | |
|---|---|
| LHCT_DEVDATA | Device data is placed in the device output buffer if there is room. The buffer capacity is compared to a high water mark for that buffer. If the buffer is near capacity and the host adapter 18' to data concentrator 28 flow state is currently on, a flag is set in the state tables to indicate that a host xoff is pending. This state information is examined and acted upon by the host transmit prioritization firmware routine. |
| LHCT_FLS | A flow control action is performed according to the contents of the addressed packet data field. One of four flow control actions may be selected by a sub-field (flow type) of the data field:<br>Flow type LHCST_FLOWX - A flow control character is transmitted to the device. The flow control character is sent immediately, before any data from the device output buffers is sent. The flow control character that is sent to the device is selected by the remaining portion of the data field, and is one of the characters set by the LHCT_SETXON or LHCT_SETXOFF frames. The data concentrator 28 does not return a command response for this flow type.<br>Flow type LHCST_SETLINE - The state of the modem control signal output lines are set according to the remainder of the data field. The data concentrator 28 does not return a command response for this flow type.<br>Flow type LHCST_TXDELAY - The data concentrator 28 assembles a delay escape sequence in the device output buffer if there is room. The buffer capacity is checked and acted upon as if the escape sequence were device data. See the description for frame-type LHCT_DEVDATA. The data concentrator 28 does not return a command response for this flow type.<br>Flow type LHCST_TXBREAK - The data concentrator 28 assembles a break signal escape sequence in the device output buffer if there is room. The buffer capacity is checked and acted upon as if the escape sequence were device data. See the description for frame-type LHCT_DEVDATA. The data concentrator 28 does not return a command response for this flow type.<br>Flow type LHCST_SETAF - This type sets automatic hardware flow control modes of the data concentrator 28 which remain in effect until changed by another command, or until the data concentrator |

| | |
|---|---|
| | 28 or channel is reset. The auto DSR option configures the data concentrator 28 to respect the DSR signal from the device as a flow control signal. If this state is set, the data concentrator 28 will halt transmission of data to the device when the signal is negated, and resume transmission when this signal is asserted. The auto CTS option operates similarly. The auto RTS option configures the data concentrator 28 to assert the RTS signal when there is data available for transmission to a device, and negate the signal at all other times. |
| LHCT_RCOND | This frame sets the status reporting conditions of the data concentrator 28. The conditions remain in effect until changed, or until the data concentrator 28 or channel is reset. The following options are defined:<br>Reporting condition LHC_RDSR, LHC_RDCD, LHC_RCTS - When this option is selected, the data concentrator 28 will transmit a modem control signal line status frame to the host any time that a selected input signal changes states. The modem signal line status frame will always reflect the state of all three signal lines.<br>Reporting condition LHC_FLIB - When this option is selected in conjunction with LHC_RBRK, the data concentrator 28 will flush the host output buffer of data from a particular device when a break signal is detected. LHC_RBRK must also be selected for this option to take effect.<br>Reporting condition LHC_RBRK - When this option is selected, the data concentrator 28 will transmit a status change frame to the host adapter 18' any time a break signal from a device is detected.<br>Reporting condition LHC_RPE - When this option is selected, the data concentrator 28 will transmit a parity error frame to the host adapter 18' any time a parity error from a device is detected. The parity error frame will contain the data received from the device.<br>Reporting condition LHC_RFE - When this option is selected, the data concentrator 28 will transmit a status change frame to the host any time a framing error from a device is detected.<br>Reporting condition LHC_RRXO - When this option is selected, the data concentrator 28 will transmit a status change frame to the host any time a UART receiver overrun occurs. |
| LHCT_SBR | This frame selects the data rate for a device port and selects detection modes for flow control characters. If the flow control character detection option LHC_XFLOW is set, the data concentrator 28 will recognize the flow characters as set by LHCT_SETXON and LHCT_SETXOFF frames. If LHC_XANY is set in conjunction with LHC_XFLOW, any character is considered to be an XON character. |
| LHCT_LPARM | This frame sets the operating parameters of a device port. Character length, stop bits, parity type, and parity enable are the parameters which are set. |
| LHCT_SETXON | This frame sets the XON character for a device port. When the flow character is set, and LHC_XFLOW is set in the LHCT_SBR frame, the data concentrator 28 will recognize this character as the XON character. |
| LHCT_SETXOFF | This frame sets the XOFF character for a device port. When the flow character is set, and LHC_XFLOW is set in the LHCT_SBR frame, the data concentrator 28 will recognize this character as the XOFF character. |
| LHCT_CMD | This frame selects various operating mode and diagnostic states. The data field contains the command type to set the particular state or to request the particular action. The data concentrator 28 responds with a command acknowledgement when the command is processed. The following command types are defined:<br>Command type LHC_FWV - This type requests the data concentrator 28 to return the firmware version number. The data concentrator 28 returns a firmware version type frame containing the version number.<br>Command type LHC_WOB - This type sets an operating mode in the data concentrator 28 which causes it to wait for a device output buffer to empty and report the output buffer empty state to the host adapter 18'.<br>Command type LHC_RLS - This type requests the modem control signal line status. The data concentrator 28 transmits a modem control signal line status frame containing the current state of all signal lines.<br>Command type LHC_FIB - This requests that the host output buffer be flushed of data for a particular device.<br>Command type LHC_FOB - This requests that the device output buffer be flushed of data.<br>Command type LHC_ETX - This enables the transmitter for a particular channel. The data concentrator 28 enables transmitter interrupts and begins servicing them. The transmitter remains enabled until specifically disabled or until programmed flow control disables it.<br>Command type LHC_DTX - This disables the transmitter for a particular channel. It remains disabled until specifically enabled.<br>Command type LHC_ERX - This enables the receiver for a particular channel. It remains enabled until specifically disabled.<br>Command type LHC_DRX - This disables the receiver for a particular channel. It remains disabled until specifically enabled.<br>Command type LHC_ETR - This enables the transmitter and receiver for a particular channel.<br>Command type LHC_DTR - This disables the transmitter and receiver for a particular channel.<br>Command type LHC_SLL - This sets local loopback mode for a particular channel. When this mode is set, the UART of that channel will route transmitted data back to the receiver. This mode remains in effect until the channel is reset or until loopback mode is reset.<br>Command type LHC_SRL - This sets remote loopback mode for a particular channel. When this mode is set, the UART of that channel will route received device data back to the device. The mode remains in effect until the channel is reset or until loopback mode is reset.<br>Command type LHC_RLL - This resets local loopback mode for a channel.<br>Command type LHC_RRL - This resets remote loopback mode for a channel.<br>Command type LHC_RSP - This resets a device channel (port). The transmitter and receiver are disabled, and any data in |

```
the transmit or receive FIFO is flushed.
Command type LHC_HLB - This sets
HSRT loopback mode. When this mode is
set, any data received from the host is sent
back to the host. This mode remains in
effect until the data concentrator 28 is
reset.
```

When the microcontroller 74 is reset as described previously, the data concentrator 28 performs self test diagnostic routines and reports the results of the diagnostic to the host adapter 18'. If any test fails, an error is reported and the firmware then performs a jump to the beginning of its main polling loop. Once the host adapter 18' has received the error code, it may assume that the data concentrator 28 is attempting to accept and process data on the high speed link. The host adapter 18' may then attempt to determine the extent of the error by issuing sequences of diagnostic mode setting commands and data frames.

The first reset self test to be performed is a ROM checksum test, followed by a RAM test. If both the memory tests pass, the data concentrator 28 executes an internal loopback test for all eight channels of the UART 78. After the data concentrator 28 executes the loopback test, it sends a frame to the host adapter 18' to indicate the test results. The data concentrator 28 then performs a jump instruction to the beginning of its main polling loop.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A data transferring system for transferring data between a host computer and a plurality of TTY devices, comprising:

the host computer comprising:
   a system bus,
   memory coupled to said system bus for storing data, wherein said memory includes:
      a data buffer comprising an array of data groups, wherein each said data group comprises a list of data bytes sent from said one of said plurality of TTY devices, or to be sent to said TTY device,
      a contents array comprising a list of pointers followed by a null value, said null value for terminating said contents array, wherein each said pointer compresses a device identification handle identifying one of the plurality of TTY devices, and a count, wherein each consecutive pointer corresponds to each consecutive data group in said data buffer, and wherein said count determines the number of consecutive data bytes contained in said data group,
      a receive array comprising a list of input data buffer sizes, each said input data buffer size comprising a device identification handle identifying one of said plurality of TTY devices, and a count representing the maximum number of data bytes said host computer can receive from said TTY device, and
      a transmit array comprising a list of output data buffer sizes, each said output data buffer size comprising a device identification handle identifying one of said plurality of TTY devices, and a count representing the maximum number of data bytes said TTY device can receive from said host computer; and a host adapter coupled to the plurality of TTY devices, said host adapter comprising:
   a system bus coupled to said host computer system bus,
   memory coupled to said host adapter system bus and said plurality of TTY devices, for storing data, including:
      a contents array corresponding to said host computer contents array, a transmit array corresponding to said host adapter and a receive array corresponding to said host computer receive array, and
      a plurality of device input buffers, each said device input buffer for accumulating data from a corresponding one of said plurality of TTY devices, and
      a plurality of device output buffers, each said device output buffer for accumulating data from said host computer to be sent to a corresponding one of said plurality of TYY devices; and
   means coupled to said host computer and said host adapter for transferring data between said host adapter memory and said host computer memory,
   wherein said host adapter updates the corresponding pointer in said contents array, determines the remaining amount of memory left in each said device output buffer and updates the corresponding host adapter transmit array output data buffer size, and for each one of said plurality of device input buffers, said data transfer means transfers a number of data bytes from said device input buffers into a corresponding host computer data buffer data group wherein said number of data bytes is less than or equal to said count in the corresponding receive array output data buffer size, and wherein said data transfer means transfers said host adapter contents array into said host computer contents array, and
   transfers said host adapter transmit array into said host computer transmit array, and
   wherein said host computer transfers a number of output data bytes intended for one of said plurality of TTY devices into a corresponding data group in said data buffer wherein said number of output data bytes is less than or equal to said count in the corresponding output data buffer size in said transmit array, updates a corresponding pointer in said contents array, and updates a corresponding host computer receive array input data buffer size, and wherein said data transfer means transfers said host computer receive array into said host adapter receive array, transfers said host computer contents array into said host adapter contents array, and transfers each data group in said host computer data buffer into a corresponding host adapter device output buffer.

2. The system of claim 1, wherein said data transfer means comprises a bus master located on said host adapter.

* * * * *

UNITED STATES PATENT AND TRADEMARK OFFICE
CERTIFICATE OF CORRECTION

PATENT NO. : 5,319,754

DATED : June 7, 1994

INVENTOR(S) : Jon M. Meinecke, et al.

It is certified that error appears in the above-identified patent and that said Letters Patent is hereby corrected as shown below:

In col. 56, line 29, please replace "," with --;--.

Signed and Sealed this

Sixth Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,319,754
DATED        : June 7, 1994
INVENTOR(S)  : Jon M. Meinecke et al.

It is certified that error appears in the above-identified patent and that said Letters Patent is hereby corrected as shown below:

Column 55,
Line 53, delete "compresses" insert -- comprises --.

Signed and Sealed this

Tenth Day of January, 2006

JON W. DUDAS
*Director of the United States Patent and Trademark Office*